May 19, 1931. J. H. HAMMOND, JR 1,806,346
PARAVANE TORPEDO
Filed Feb. 8, 1928 9 Sheets-Sheet 5
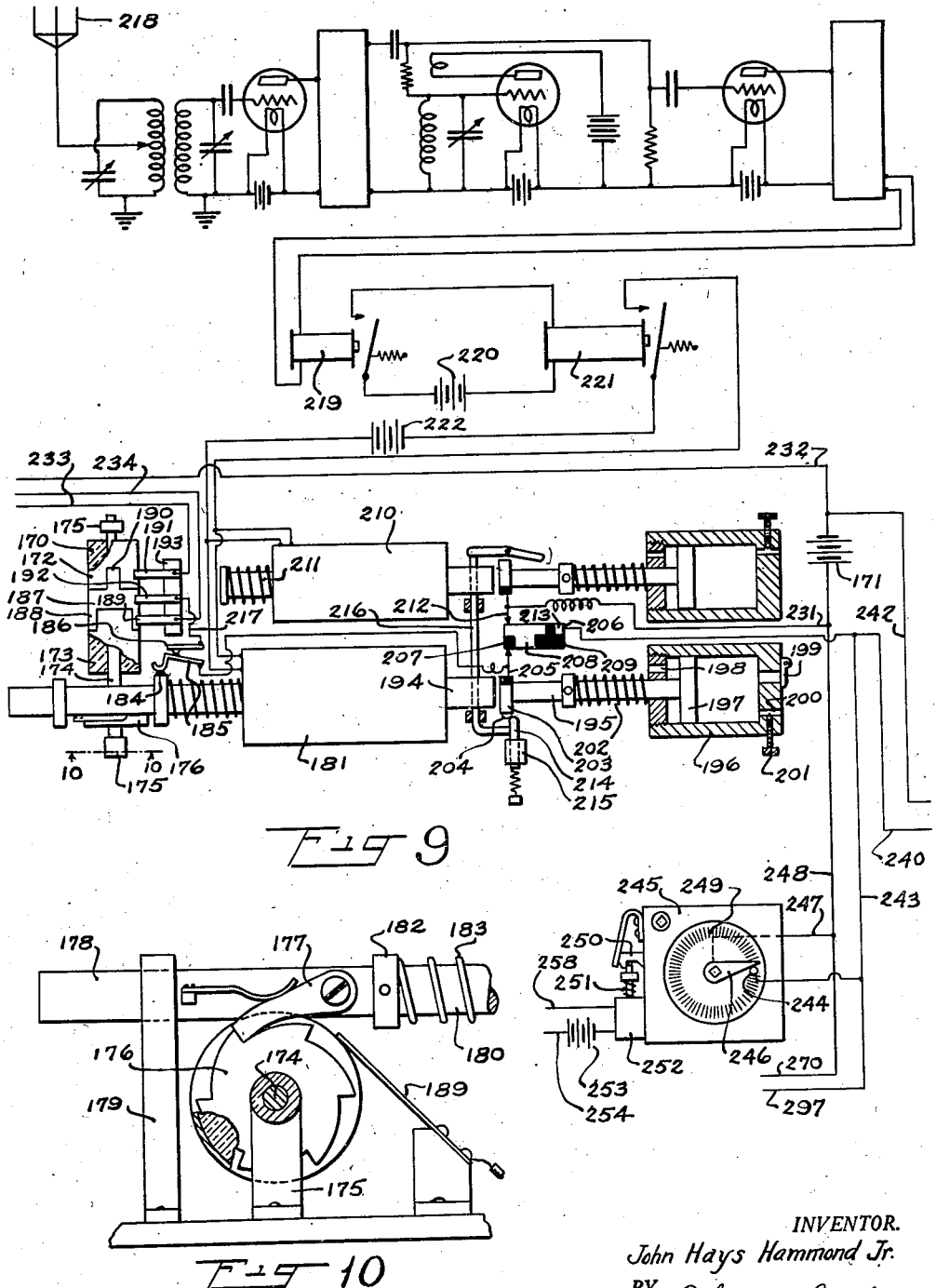
INVENTOR.
John Hays Hammond Jr.
BY
ATTORNEY.

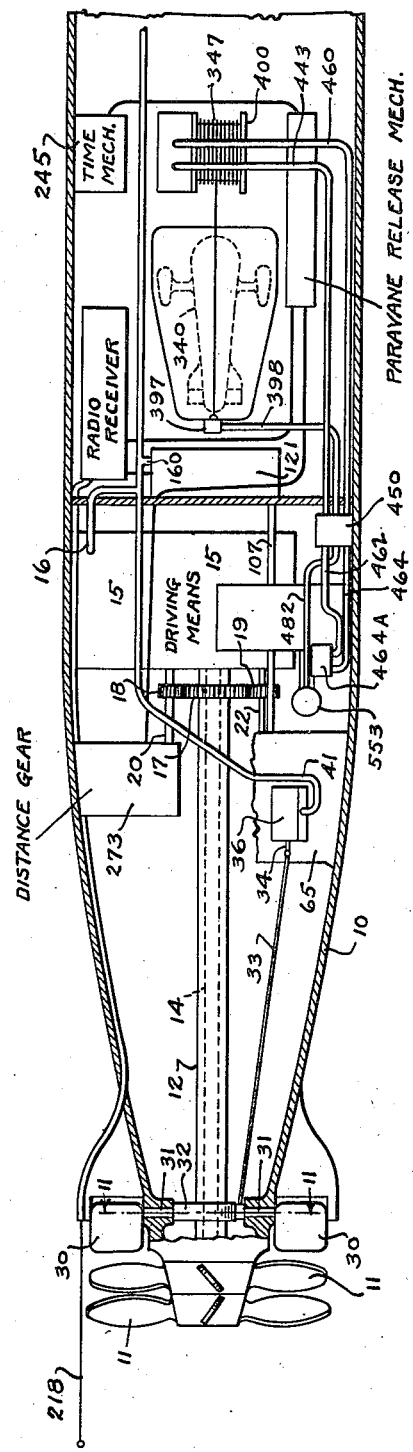

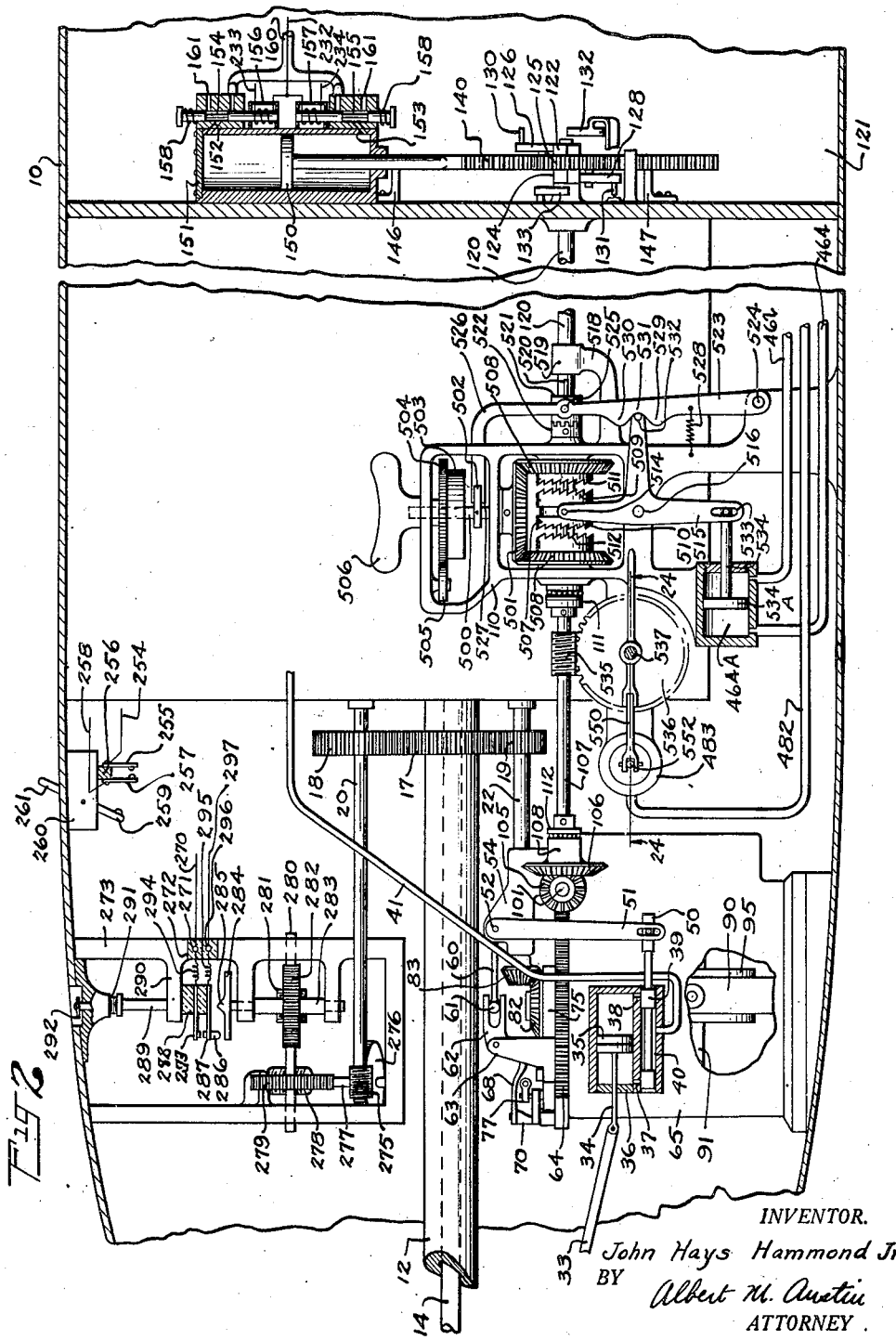

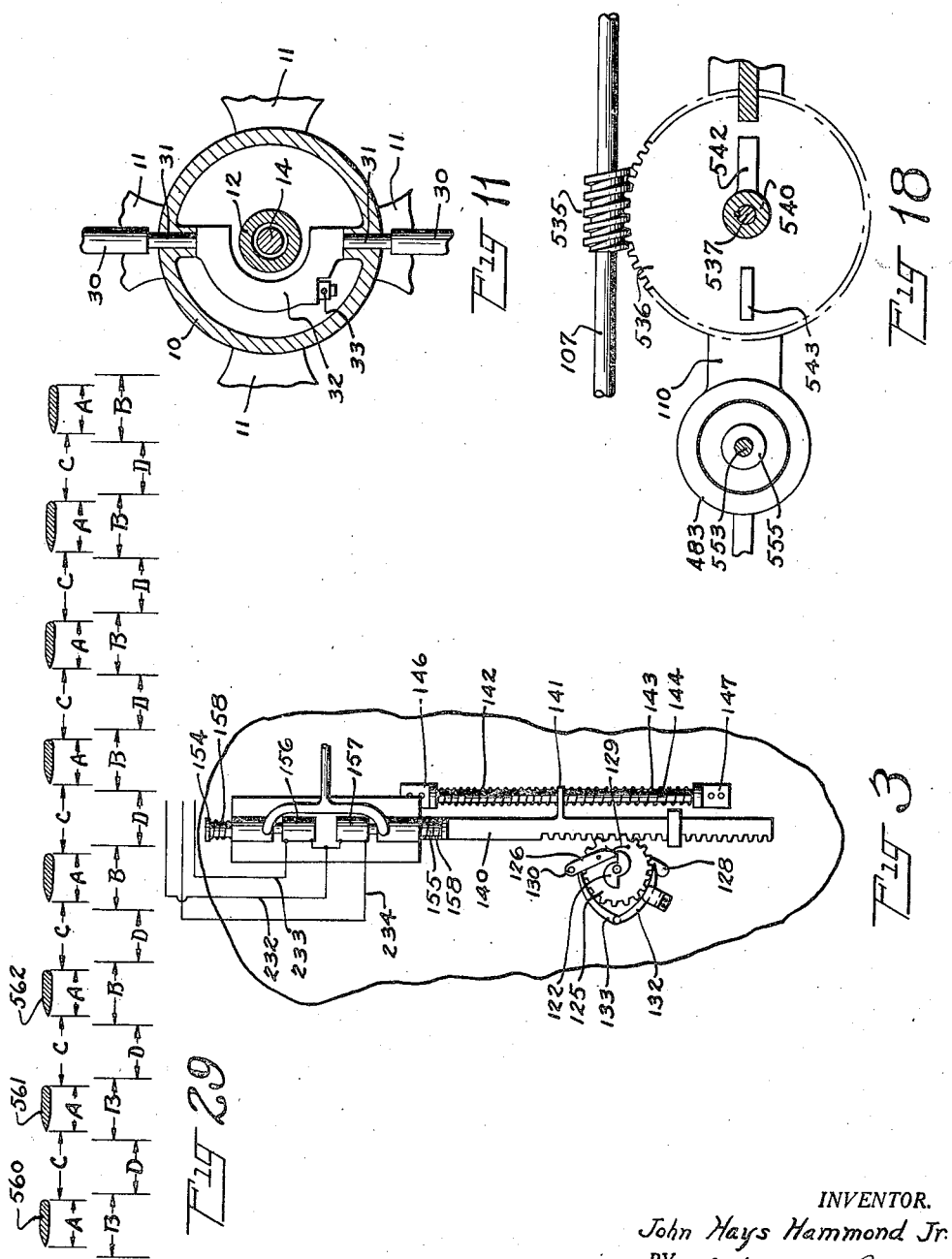

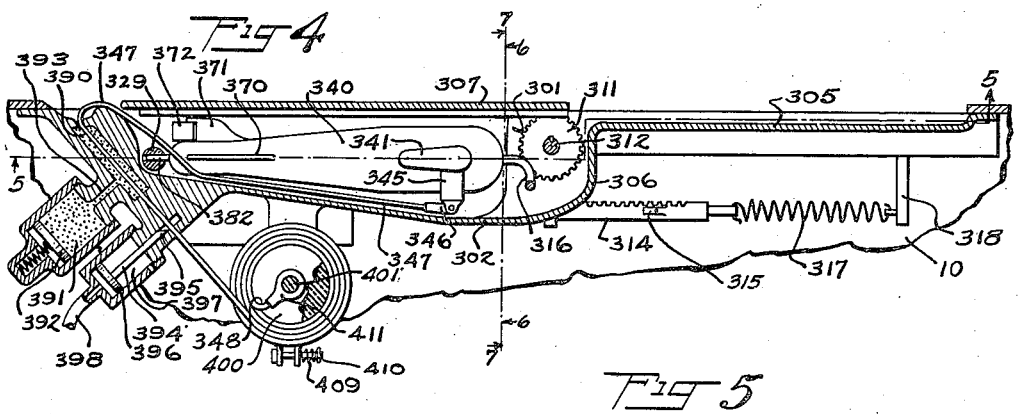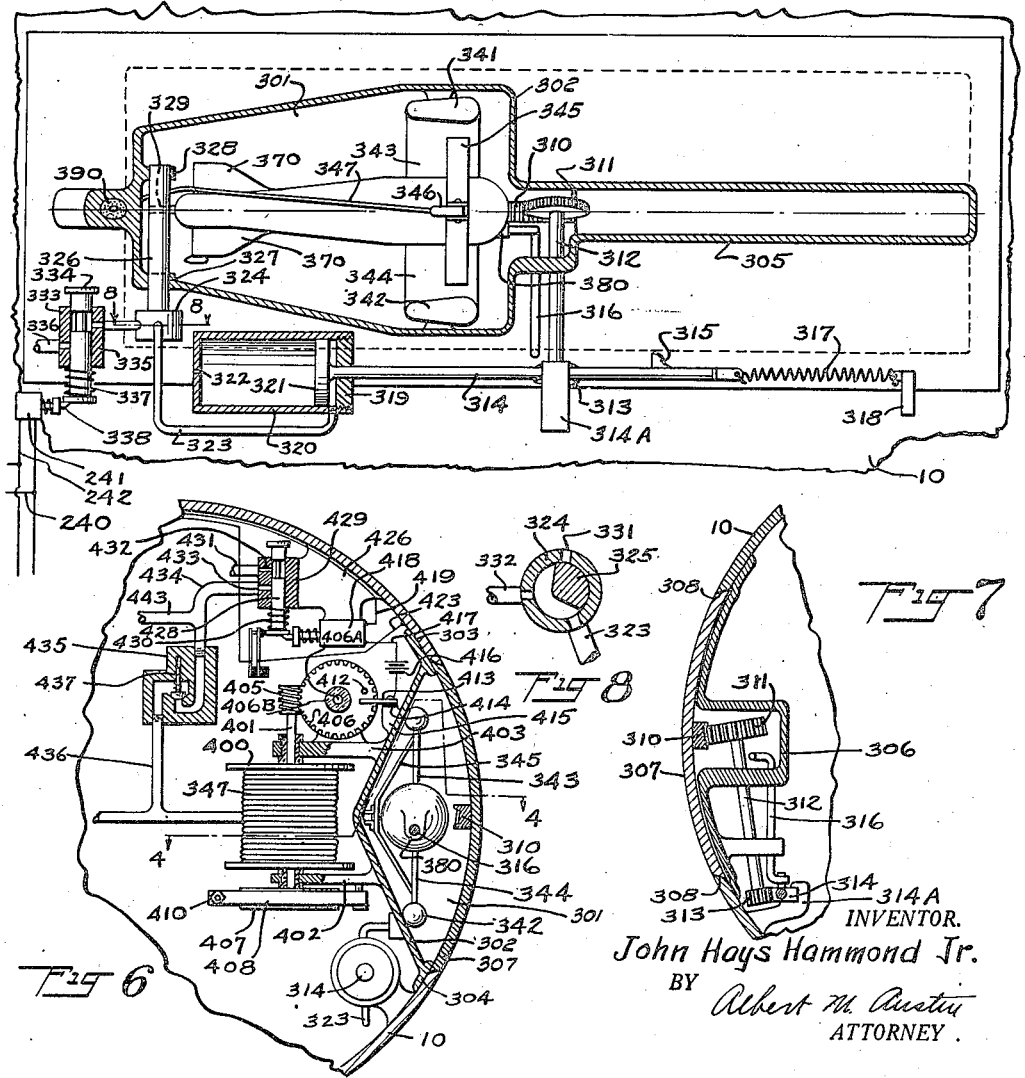

May 19, 1931.   J. H. HAMMOND, JR   1,806,346
PARAVANE TORPEDO
Filed Feb. 8, 1928    9 Sheets-Sheet 6
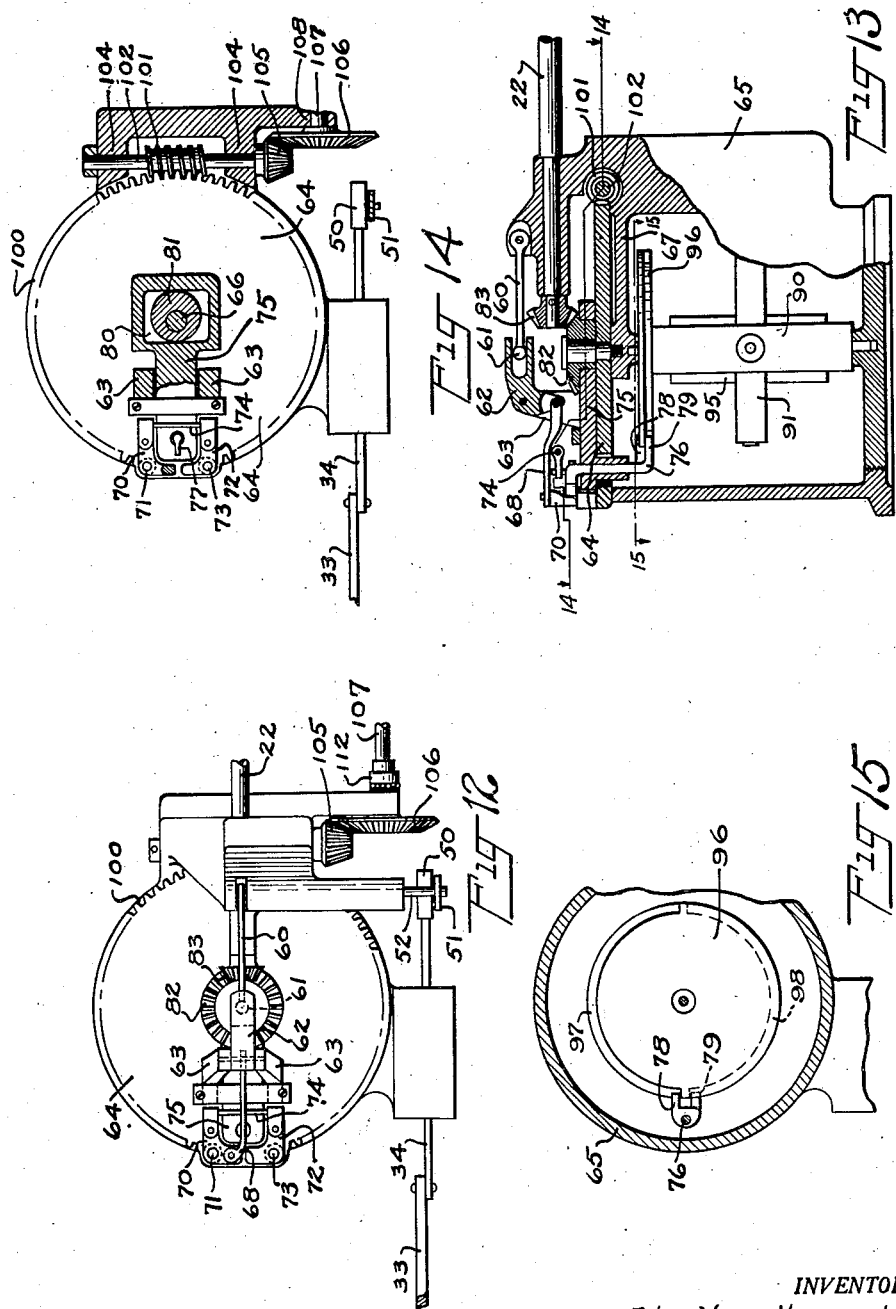
INVENTOR.
John Hays Hammond Jr.
BY Albert M. Austin
ATTORNEY.

May 19, 1931.                J. H. HAMMOND, JR                1,806,346
PARAVANE TORPEDO
Filed Feb. 8, 1928      9 Sheets-Sheet 7
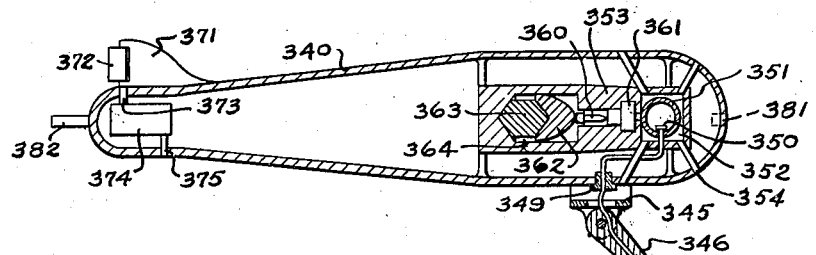
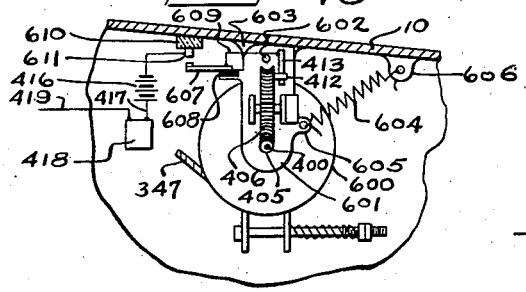
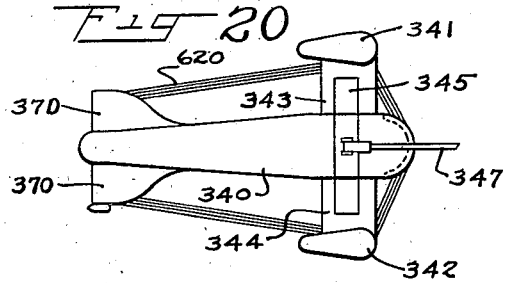
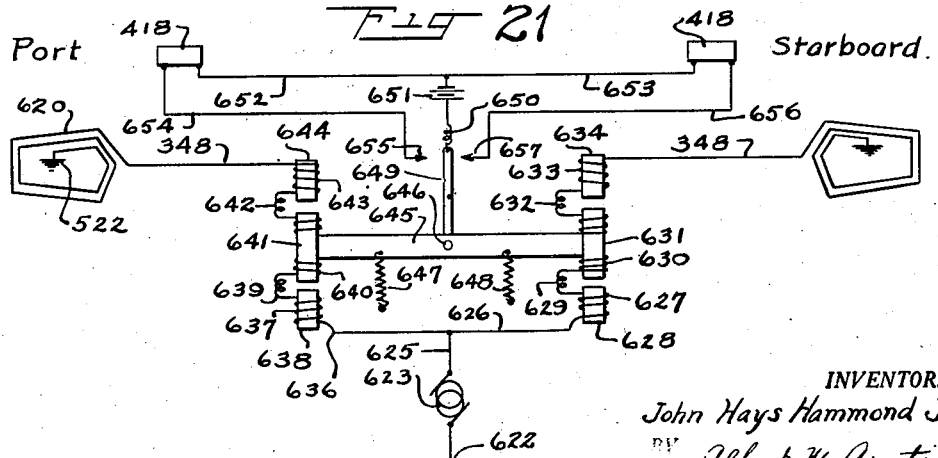
INVENTOR.
John Hays Hammond Jr.
BY Albert H. Austin
ATTORNEY May 19, 1931.  J. H. HAMMOND, JR  1,806,346
PARAVANE TORPEDO
Filed Feb. 8, 1928  9 Sheets-Sheet 8
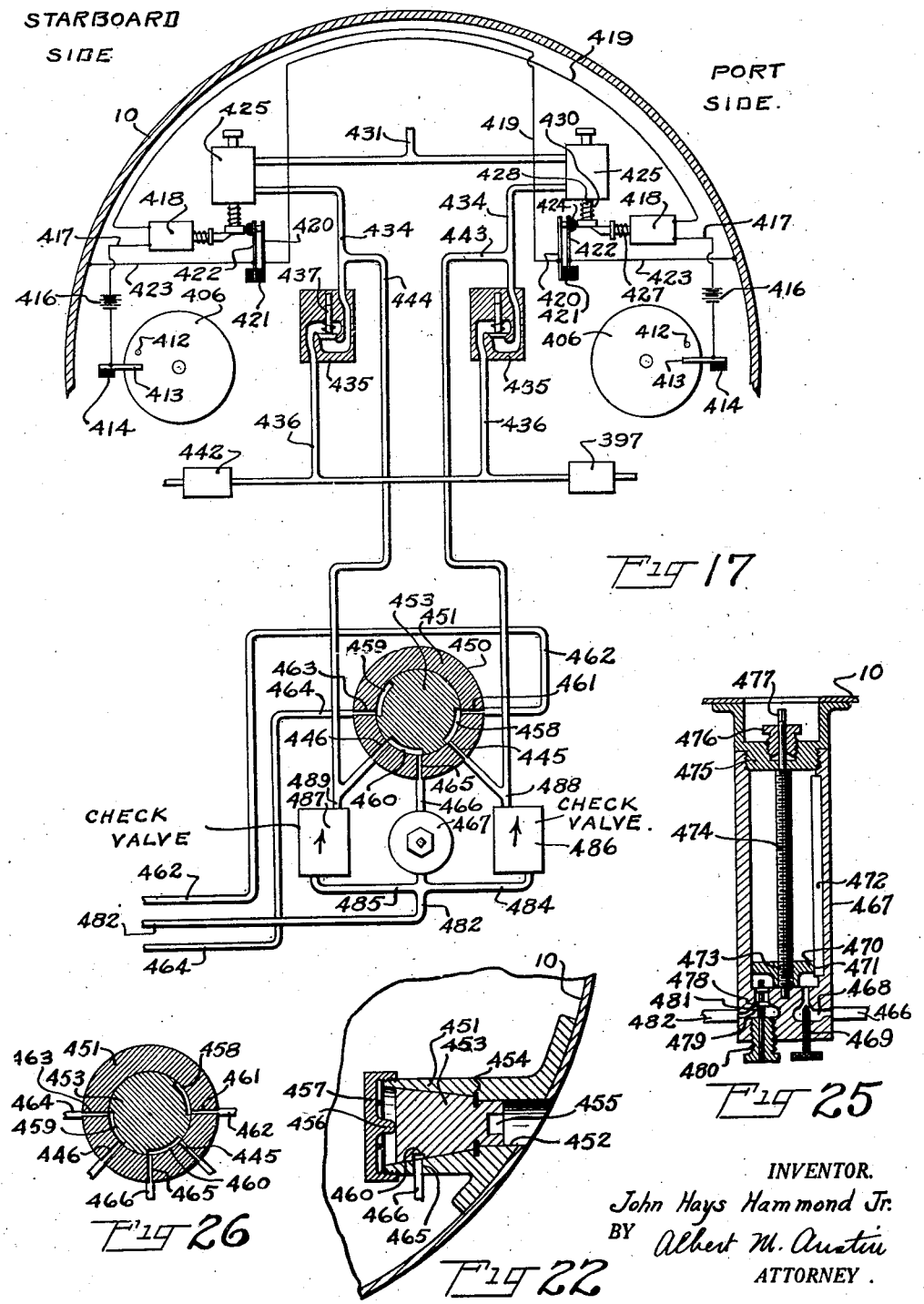
INVENTOR.
John Hays Hammond Jr.
BY Albert M. Austin
ATTORNEY.

May 19, 1931.  J. H. HAMMOND, Jr  1,806,346
PARAVANE TORPEDO
Filed Feb. 8, 1928   9 Sheets-Sheet 9
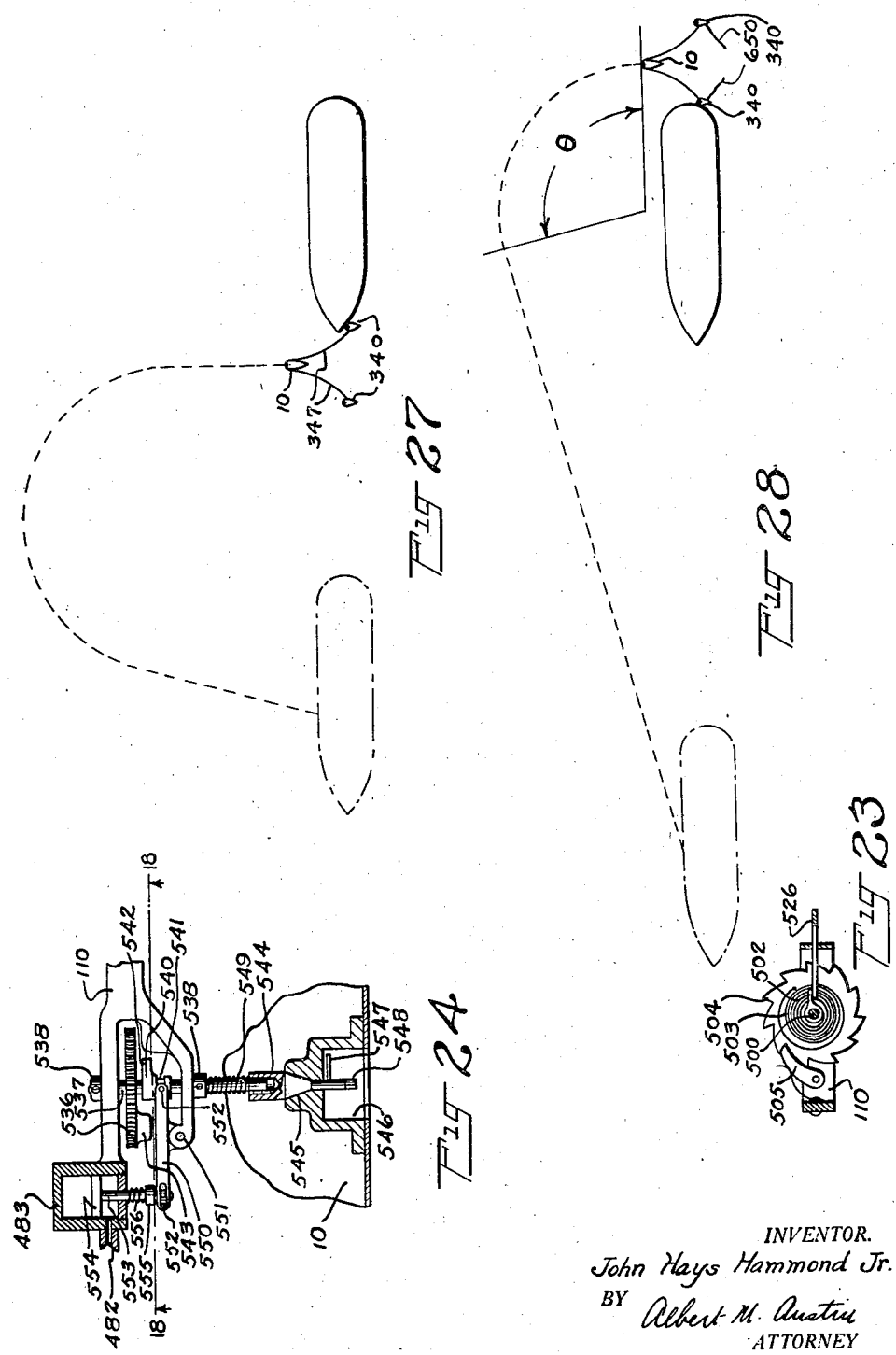
INVENTOR.
John Hays Hammond Jr.
BY Albert M. Austin
ATTORNEY Patented May 19, 1931

1,806,346

UNITED STATES PATENT OFFICE

JOHN HAYS HAMMOND, JR., OF GLOUCESTER, MASSACHUSETTS

PARAVANE TORPEDO

Application filed February 8, 1928. Serial No. 252,716.

This invention relates to the control of moving bodies.

One object of the present invention is to provide improved means for increasing the efficiency of self-propelled carriers of explosives when directed against an enemy fleet. Such carriers or torpedoes are used in warfare extensively for the purpose of attacking an enemy fleet of battleships. Reference is made to "The Grand Fleet" by Admiral Jellicoe, Chapt. 15, pages 396—7, which reads:

"In the case of a British line of eight battleships attacked 'beam on', the chances of a hit for torpedoes which reach the British line may be assessed roughly at 7 to 9, taking the length of a ship 600 feet, and the distance from the bow of one ship to the bow of the next astern as two and a half cables, that is 1500 feet, thus giving a total length of ships of 4800 feet, and the total of the intervals between them as 6300 feet."

According to the present invention, the chances of making a hit under conditions similar to those outlined by Admiral Jellicoe will be greatly increased, and thus the effectiveness of the torpedoes greatly improved. In accordance with the foregoing object, the present invention provides for separable bodies which are arranged to control the movement of a main body selectively. The separable bodies are arranged to maintain the same direction of movement of the main body but the course of each is spaced apart from the others.

According to one feature of the invention, improved means are provided effective when any of the separable bodies strikes an object to modify or control the course of the explosive carrier so as to insure contact of the explosive carrier with the object so struck. The explosive may then be discharged in order to inflict damage upon the object.

One feature of the invention relates to improved means for initiating the action of the separable bodies, so that the main body can be effectively controlled and brought into proximity with the enemy fleet at high speed.

Another important feature of the invention relates to the provision of means controlled from a distance to render the releasing means effective.

Other features and objects will appear from the following description taken in connection with the accompanying drawings in which Fig. 1 is a diagrammatic sectional view of a portion of a torpedo embodying features of the present invention;

Fig. 2 shows detail view of a portion of Fig. 1;

Fig. 3 is an end elevation of part of the apparatus of Fig. 2;

Fig. 4 is a longitudinal section of one of the paravane compartments of the torpedo;

Fig. 5 is a section taken on the line 5—5 of Fig. 4;

Figs. 6 and 7 are opposed sectional views, taken on the lines 6—6 and 7—7 of Fig. 4; looking in the direction of the arrows;

Fig. 8 is a section taken on the line 8—8 of Fig. 5;

Fig. 9 is a partially diagrammatic illustration of the controlled apparatus of the torpedo;

Fig. 10 is a section taken on the line 10—10 of Fig. 9;

Fig. 11 is a section taken on the line 11—11 of Fig. 1;

Fig. 12 is a top plan view of the stabilizing mechanism of Fig. 1;

Fig. 13 is a side elevation partly in section of the stabilizing mechanism.

Fig. 14 is a sectional view taken on line 14—14 of Fig. 13;

Fig. 15 is a sectional view taken on line 15—15 of Fig. 13;

Fig. 16 is a horizontal section of one of the separable bodies of paravanes;

Fig. 17 shows diagrammatically the connections of the port and starboard control valves, with the rotary valve in an operative position;

Fig. 18 is a section on the line 18—18 of Fig. 24 looking in the direction of the arrows;

Fig. 19 shows details of a modified form of control mechanism.

Fig. 20 is a side elevation of a modified form of paravane;

Fig. 21 shows schematically the electrical connections for the paravane of Fig. 20;

Fig. 22 is a vertical section of the valve shown in Fig. 17;

Figs. 23 and 24 are sections taken on lines 23—23 and 24—24 respectively of Fig. 2;

Fig. 25 is a cross section taken on line 25—25 of Fig. 17;

Fig. 26 is a sectional view of the rotary valve turned in the other operative position;

Figs. 27 and 28 diagrammatically illustrate the course of the object after engagement of the paravane with a target;

Fig. 29 shows a battle line of ships being attacked by self-propelled bodies embodying features of the present invention;

Like reference characters denote like parts in the several figures of the drawings.

In the following description and claims, parts, characteristic features and functions will be identified by specific means for convenience of expression, but they are intended to be as generic in their application to similar parts or equivalent construction as the art will permit.

Referring to Fig. 1, there is shown a water borne body forming a carrier of explosives, having a water-tight torpedo hull 10, and arranged to be propelled by a pair of propellers 11, 11. The propellers 11 are mounted on a pair of concentric shafts, including an outer shaft 12, and an inner shaft 14. The shafts 12 and 14 are directly connected to a driving means 15. The driving means 15 preferably takes the form of a conventional compressed air turbine, the actuating fluid being delivered thereto through a pipe 16. A gear 17 is keyed to the outer shaft 12 for operative engagement with gears 18 and 19 to cause rotation of shafts 20 and 22, as will hereinafter be described.

Horizontal rudders for varying the direction of movement of the torpedo about its horizontal transverse axis may also be provided in a well-known manner, but as such rudders and depth control devices for controlling the same are well known, it is thought that a more detailed description thereof is unnecessary herein.

For varying the direction of movement of the torpedo about a vertical axis so as to steer the torpedo in azimuth, there is provided a pair of blade rudders 30 pivotally mounted upon a pair of rotatable vertical rudder posts 31, whereby the rudders 30 can be moved relative to the torpedo to control the direction of movement thereof. The rudder posts 31 are shown rigidly connected by a yoke 32 (see Fig. 11) which may be shifted according to requirements by a connecting rod 33 having one end pivotally connected thereto. The other end of the connecting rod 33 is pivotally secured to a piston rod 34 of a piston 35 which is mounted for reciprocating movement in a cylinder 36. Adjacent the ends of the cylinder 36 are provided ports 37, 38, which are controlled by a slide valve 39 operating in a fluid pressure chest 40, which is in communication with a source of fluid pressure 41. The arrangement is such that the piston 35 is moved to the right or to the left according to the position of the valve 39 with respect to the ports 37, 38. The respective ports of the cylinder 36 exhaust by way of the open ends of the valve chest 40, when the valve 39 has been moved to full open position in either direction.

For actuating the slide valve 39 and also for maintaining it in position to cause the torpedo to move upon a predetermined course, two mechanisms are employed, one operating automatically under control of a stabilizing device and the other operating at the will of an operator under distant control. The parts common to the two mechanisms include an extension 50 of the slide valve 39, and having its outer end operatively connected to the free end of a rocking arm 51, the other end of which is securely fastened to a rock shaft 52 pivotally mounted in a fixed bracket 53.

As more clearly illustrated in Figures 12 and 13, for actuating the rock shaft 51 there is provided a lever arm 60 terminating in a ball 61, which is straddled by the bifurcated end of a bell crank 62, movement of which causes the shaft 52 to rock in a desired direction. The bell crank 62 is pivotally mounted on a bracket 63 which is secured to the outer face of a rotatable cover plate 64. The cover plate 64 is mounted on a housing 65 by means of a pin 66 which is screwed into a bracket 67 of the housing 65. Pivoted to the lower arm of the bell crank 62 is a link 68, the opposite end of which is pivotally connected to an L shaped member 70 rotatably mounted upon a vertical pin 71 of the cover plate 64. A similar member 72 is pivoted to the cover plate at 73. For actuating member 72 a link 74 is provided pivotally connected to the inner ends of the members 70 and 72. Slidably mounted between the feet of the bracket 63 is a reciprocating plate 75 in which is rotatably mounted a member 76, the upper end of which is provided with a finger 77 which, when the plate 75 is reciprocated, engages either the member 70 or the member 72. The lower end of the member 76 is provided with two fingers 78 and 79, which are located in two planes, one above the other. The plate 75 is provided with a slot 80, which surrounds a cam 81, rotatably mounted on the pin 66. The upper part of the cam 81 is provided with a beveled gear 82 adapted to mesh with a second beveled gear 83 secured to the end of the shaft 22 having a bearing in the bracket 53. The shaft 22 is provided with a gear 19, which meshes with the gear 17 secured to the shaft 12.

Within the housing 65 is pivotally mounted a vertical gimbal ring 90, within which a horizontal gimbal ring 91 is mounted bearing rotating massive element 95. Secured to the vertical gimbal ring 90 is a circular plate 96 cut away on either side as at 97 and 98. The cut away portions are arranged in different horizontal planes such that the cut away portion 97 lies in the same plane as the finger 78 and the cut away portion 98 lies in the plane of the finger 79. When the torpedo is discharged, the element 95 is set in rotation by means of a driving mechanism not shown, which is automatically disconnected as the element is brought up to the desired speed. The gyroscopic action of the element 95 will tend to keep its axis in a fixed direction in space. Thus the plate 96 will always remain in its original position regardless of a change in direction of the torpedo.

For controlling the valve 39 by the above described apparatus the shaft 22 is rotated at a high speed by means of the gears 17 and 19, causing the beveled gear 83 to rotate the gear 82 and cam 81 rapidly. Rotation of the cam 81 imparts a corresponding rapid reciprocation to the plate 75, carrying with it the member 76. Thus, as the torpedo continues on a straight course, the fingers 78 and 79 will move in and out of the cut out portions 97 and 98 of the plate 96, without affecting the position of the member 76 or the finger 77, which will reciprocate between the ends of the members 70 and 72 without changing their positions. If the torpedo should deviate from a straight course, say for example to the left, the casing 65 being carried by the torpedo will be rotated in a counter-clockwise direction, thus carrying with it the member 76. As the fingers 78 and 79 are moved back and forth the finger 78 will strike the plate 96 at a part where it is not cut away, thus causing a relative rotation of the member 76 in a counter-clockwise direction, which in turn will rotate the finger 77 in a like direction. As this reciprocates it will strike the end of the member 72 rotating it in a counter-clockwise direction, which by means of the link 74 will rotate the member 70 in a like direction, thus causing the link 68 to be moved to the right, causing the bell crank 62 to be rotated in a counter-clockwise direction, thereby rotating the shaft 52 in a clockwise direction by the connection therewith of the ball 61 and arm 60. By referring to Figures 1 and 2 it may be readily seen that by connection of the arm 51 to the shaft 52 rotation of the shaft 52 causes movement of the arm 51, thus moving the valve 39 to the left. This will uncover the ports 37 and 38, thus allowing air to enter the left-hand side of the cylinder 36 and pass from the right hand side, causing the piston 35 to be moved to the right which, by means of the piston rod 34 and the rod 33 will cause the rudders 30 to be moved to the right, thereby restoring the torpedo to its course.

If the torpedo deviates to the right a similar action, but in the opposite direction, will take place, causing the rudders to be moved to the left. In this way, the torpedo is maintained upon a predetermined straight course under the control of the gyroscopic element 95.

For actuating the slide valve 39 at will, for example from a station distant from the torpedo, the cover 64 has a portion of its periphery toothed as at 100, which is in mesh with a worm 101 integral with a shaft 102 (see Fig. 14). The shaft 102 is journaled in spaced bearings 104, 104 and terminates in a beveled gear 105, which is in mesh with a gear 106 mounted on a rotatable shaft 107, which is journaled in a bearing 108.

The shaft 107 is also journaled in a bracket 110 (Fig. 2) secured to the hull of the torpedo, the shaft 107 being provided with spaced ball thrust bearings 111—112. The shaft 107 terminates in a releasable clutch mechanism, whereby, when in the position shown in Fig. 2, rotation of the shaft 107 is dependent upon rotation of a shaft 120 upon which one portion of the clutch mechanism is mounted.

The opposite end of the shaft 120 protrudes into a compartment 121 shown in Fig. 1 and has fixedly secured thereto a pair of ratchets 122, 124 see Figs. 2 and 3, arranged in reversed relation so that one may turn the shaft 120 in a clockwise direction, and the other can turn the shaft in a counter-clockwise direction. The operating means for these ratchets consists of a gear 125 loosely mounted upon the shaft 120 between the ratchets, and having on opposite faces pivoted pawls 126—128 for engaging the ratchets 122—124 respectively. Each of the pawls is yieldingly maintained in engagement with its respective ratchet by a spring such as 129. In order to cause either pawl to be moved from engagement with its ratchet so that the shaft 120 can be turned in one desired direction without interference from the other pawl and ratchet, the pawls are respectively provided with laterally disposed lugs 130, 131, with which are respectively arranged to engage trip members 132—133, which are secured to the wall of the compartment 121. From the foregoing it will be apparent that if the gear 125 is moved in a clockwise direction through an angular distance of 180° that the pawl 126 will engage its ratchet 122 and likewise turn the shaft 120 through an angular distance of 180°. Similarly if the gear 125 is moved in a counter-clockwise direction through 180° the pawl 128 engages its ratchet 124, and turns the shaft 120 one half a revolution in a counter-clockwise direction. While turning in a clockwise direction, the lug 131 of the pawl 128 engages one face of the respective trip member 133, and thus during the turning movement of the gear 125, the pawl 128 is oscillated about its pivot in a clockwise direction, and thus will be held out of engagement with the ratchet 124, so that upon the return of the gear 125 to its normal position the pawl 128 will be held in inactive position with the respective ratchet and will not be engaged thereby. Thus it will be seen that rotation of the gear 125 through an angular distance of 180° operates the shaft 120 in a similar manner, but that restoration of the gear does not restore the shaft.

For controlling movement of the loose gear 125 there is provided a reciprocating rack gear 140, having a lug 141 in engagement with a pair of restoring springs 142—143. The springs 142, 143 are mounted on a rod 144 and are held by brackets 146, 147 respectively secured to the compartment 121. Springs 142, 143 have substantially equal tension, and serve to restore the rack 140 to normal position shown in Figs. 2 and 3. One end of the rack 140 is secured to a piston 150 snugly fitted for reciprocating movement within a cylinder 151. The ends of the cylinder are respectively provided with ports 152, 153, the port 152 being controlled by an electrically operated slide valve 154, and the port 153 being controlled by a similar valve 155. The slide valves 154, 155 are arranged to be actuated by solenoids 156—157 respectively, and each is provided with a retractile spring, such as 158. Each slide valve is arranged so that upon energization of the respective magnet, the valve port is connected to a branch pipe 160 leading to the supply source 16, and the piston 150 is moved accordingly. Upon release of the magnet the valve is restored by the action of the respective spring 115, and the valve port is connected to atmosphere through a vent 161. The piston is restored to its initial position under control of spring 142, 143. The arrangement is such that actuation of piston 150 as just described moves the rack 140 sufficiently to rotate the gear 125 through an angular distance of slightly more than 180°, and thus moves the shaft 120 one half a revolution. The consequent turning of the cover plate 64, and movement of the arm 51 and rod 50 operates the rudder arm 33 to turn the torpedo 5°.

Referring to Fig. 9, for controlling the magnets 156, 157 selectively so as to steer the torpedo in either direction about its vertical axis at the will of a distant operator, the magnets are connected in circuit with a controller 170 and a source of energy such as a battery 171. The controller 170 comprises a commutator 172 having a cylindrical insulating base 173 mounted on a shaft 174. The shaft 174 is journalled in a pair of spaced brackets 175. A ratchet wheel 176 is rigidly secured thereto, and is engaged by a spring pressed pawl 177 pivotally mounted on a reciprocating stem 178. The stem 178 is slidably mounted near one end in a fixed bracket 179. At its other end the stem 178 is secured to a magnetic core 180 forming the armature of a solenoid 181. A collar 182 is pinned to the stem 178 and serves as an abutment for a compression spring 183 to restore the stem 178 and the armature 150 to normal. The collar 182 carries an insulating stud 184 which normally engages a contact spring 185 mounted on an insulating bracket. When engaged by the stud 184 in the normal position of the collar 182 the spring 185 is held against a second contact spring 186. When the collar 182 moves off normal, however, the stud releases the spring 185 which then disengages the spring 186 and opens the circuit. The arrangement is such that, upon energization of the solenoid magnet 181, the core 180 is moved to the right of Fig. 9, the pawl 177 being drawn inactively over the next tooth of the ratchet 176. Upon de-energization of the solenoid, the armature moves to the left under control of the spring 183 and the pawl 177 moves the ratchet 176 in a counter-clockwise direction as seen in Fig. 10.

A conducting plate 187 having segments 188 contacting in alternate positions of the ratchet 176 with a contact spring 189, and similar segments 190 contacting in the remaining positions with a contact spring 191, is mounted on the insulating base 193, and is connected to a contact spring 192. The springs 189, 191, 192 are mounted on the insulating block 193.

The inner end of the solenoid core 180 has secured thereto an extension 194, formed of non-magnetic material, and having an end protruding outwardly of the solenoid to engage one end of a dash pot rod 195. The rod 195 is slidably mounted in an end of a cylinder 196, and terminates therein in a piston 197, which is snugly fitted within the cylinder. One end of the cylinder has an open vent 198. The other end has a trap valve 199 arranged to permit the emission of air therefrom freely, but to prevent the entry of air. An adjustable passage 200 having a needle valve 201 permits the entry of air through the passage 200 at a regulated rate. A spring 202 mounted on the rod 195 tends to maintain the rod in its left-hand position. It will thus be seen that the piston 197 moves freely to the right, but that its return is delayed by the restricted flow of air through the needle valve 201. The outer end of the rod 195 carries a brush holder 203, one end of which is formed into a latch member 204. A contact brush 205 is carried by the holder 202, and makes sliding contact with a commutator 206. The commutator includes an insulating segment 207, upon which the contact brush 205 normally rests when the rod 195 is in its normal or initial position; a conducting segment 208, to which the brush 205 makes electrical contact when the rod 195 moves off normal a limited extent; and an insulating segment 209, over which the brush 205 sweeps when the rod 195 is moved to the right to a greater extent.

A second similar solenoid 210 is connected in multiple with the winding of the solenoid 181, and is mounted in spaced parallel relation thereto. The second solenoid 210 includes an armature core 211 formed of paramagnetic material, the general assembly being substantially similar to the assembly in combination with the solenoid 181. However, no trap valve is provided in the dash pot arrangement, so that movement of the core 211 is retarded in either direction. Mounted upon a collar such as 203 is a contact brush 212, which makes a sliding contact with a portion of the commutator 206. The arrangement is such that in its normal position the brush 212 engages the conducting segment 208, and continues to engage this segment for most of its travel. Further movement of the rod carries the brush 212 into engagement with the insulating segment 209, after which, in the fully operated position of the rod the brush 212 engages a conducting segment 208.

For latching the second dash pot rod under control of the rod 195, the latch member 204 engages a spring-pressed latch 214, slidably mounted in a bracket 215, and having secured thereto one end of a lever system 216, the arrangement being such that after the solenoids 181, 210 are energized for a sufficient length of time to permit the dash pot rods to be moved to the right to the full extent of their travel, the brush 212 will be held locked against retraction by the engagement therewith of the lever system. In this position the brush 212 is on the insulating segment 213. The rod is maintained in this position until the other dash pot rod 195 returns to its initial position whereupon the latch member 204 pushes the latch member 214 outwardly against the tension of the spring. The consequent movement of the latch member 214 is communicated by the lever system 216, thus releasing the second dash pot rod, and permitting it to return to normal under control of its spring. Thus it will be seen that after the dash pot rods have been fully operated the brush 212 is maintained on the insulating segment 208, while the brush 205 is passing over the conducting segment 208. Thus no impulse is transmitted over the conductor 217.

For receiving radiant energy to operate the solenoids 181, 210 from a distant point, there is provided an insulated antenna 218 arranged to trail after the torpedo, during its movement through the water, the outer end being insulated to prevent grounding. The torpedo end of the antenna is connected to a tapped inductance, one terminal of which is grounded to the hull 10 of the torpedo. The other terminal of the inductance is connected through a variable condenser to ground, thus forming an open oscillatory circuit, which may be readily tuned by adjustment of the condenser to the frequency of energy, which is to be received. The inductance is inductively coupled to a secondary winding, which is shunted by a variable condenser, and forms in combination therewith a secondary, closed oscillatory circuit, which may be similarly tuned to the frequency of the received energy by adjustment of the condenser. The secondary circuit is connected through a blocking condenser to a three electrode thermionic device, preferably in the form of a so-called vacuum tube having an evacuated container; a cathode, shown in the form of a heated filament, for emitting electrons, a grid for controlling the passage of electrons and a plate upon which the electrons impinge. The plate or output circuit includes an amplifier for amplifying the energy impressed thereon by the vacuum tube. The vacuum tube thus serves as a detector of received energy which may take the form of complex radiant energy of high frequency, having impressed thereon intermediate amplitude variations modulated in accordance with a signal. The intermediate frequency thus appears in the output circuit of the rectifying tube and is amplified by the amplifier. The intermediate frequency is impressed upon an inductance, having in shunt therewith a variable condenser, the inductance and condenser forming in combination a closed oscillatory circuit which may be tuned to the intermediate frequency by adjustment of the variable condenser. The inductance is coupled to a tickler coil, which is included in the plate circuit of a vacuum tube oscillator, the input of which is connected to the inductance. The vacuum tube thus serves as a generator of the intermediate frequency and permits the suppression of the intermediate frequency excepting when the signal is being transmitted. The current of intermediate frequency is impressed through a second blocking condenser upon a second detector, also of the three electrode vacuum tube type, the output circuit of which includes an amplifier of signal energy. The output of the amplifier is connected to the winding of a sensitive relay 219, the contact of which controls a local circuit including a source of energy 220, and the winding of a secondary relay 221. The contacts of the secondary relay 221 are included in a circuit having connected in series therewith a source of energy, such as a battery 222, and the windings of the solenoids 181, 210 in multiple. It will thus be seen that when energy of predetermined characteristic is impressed upon the antenna 218, it is rectified by the first detector, and the detected energy is amplified by the amplifier, and is combined with the locally generated energy produced by the oscillator, the energy of intermediate frequency being detected by the second detector when the single current is amplified by the amplifier to operate the relay 219; and that the consequent operation of the relay 219 causes the operation of the secondary relay 221, which in turn causes the energization of the solenoids 181, 210 in multiple.

The circuit of the controller 170 includes a conductor 217 extending from the brush 192 to the contact spring 186. When the brush 205 engages the conducting segment 208 the circuit is extended to the brush 212, and a flexible conductor 231 to one pole of the battery 171, the other pole of which is connected by a conductor 232 to one terminal of each of the windings 156, 157 (see Fig. 3). The other terminal of the winding 156 is connected by a conductor 233 to the brush 191 of the controller 170. Similarly the other terminal of the winding of the other solenoid 157 is connected by conductor 234 to the brush 189 of the controller 170. A flexible conductor interconnects the contact spring 185 and the brush 205.

The segment 213, which is engaged by the brush 212 when the rod is moved to its full extent of travel, is connected by a conductor 240 to one terminal of a winding of a solenoid 241 (see Fig. 5), the other terminal of which is connected by conductor 242 to one pole of the battery 171. As clearly shown in Fig. 5, the two solenoids 241 of the port and starboard sides are connected in multiple. The conductor 240 is also connected by a branch conductor 243 to a contact pin 244 which is mounted on but insulated from a time controlled mechanism 245, the conductor 244 being engaged by a rotatable contact arm 246, which is connected by way of conductors 247, 248 to one pole of the battery 171. The arm 246 is movable over a calibrated dial 249, and may be preadjusted in selected position thereon manually before the torpedo is fired. The arm 246 thus remains in adjusted position under control of a spring-pressed release rod 250, which is engaged by an armature core 251. The core 251 forms the armature of a solenoid 252, the winding of which is connected to a source of energy such as a battery 253 and to a conductor 254, which extends to a contact spring 255 mounted on an insulating block 256 (see Fig. 2). The contact spring 255 is arranged to be engaged by a second contact spring 257 mounted on the insulating block 256, and connected by conductor 258 to the other terminal of the winding of the solenoid 252. An arm 259 is pivotally mounted in a packing box 260 secured to the torpedo hull 10, and having an outwardly extending trigger 261, which may be released manually when the torpedo is fired. The arrangement is such that when the trigger 261 is thus released the arm 259 engages the spring 257 so as to contact with the spring 255, and thus close the circuit of the solenoid 252, so as to initiate the operation of the time controlled mechanism 245. It will thus be seen that the solenoids 241 may be actuated after a predetermined time interval after the torpedo is fired.

The conductor 248 is also connected by a branch 270 to a terminal lug 271 mounted in an insulated bushing 272 secured to a frame 273.

In the frame 273 is mounted a distance gear comprising a worm 275 for driving a worm wheel 276 at a reduced rate of speed. The worm wheel 276 is mounted on a shaft 277, having a second worm 278 for engaging a second worm wheel 279. The worm wheel 279 is mounted on a shaft 280, having a third worm 281 for engaging a third worm wheel 282. The worm wheel 282 is mounted on a shaft 283 which terminates in a cam wheel 284. The cam wheel 284 includes a cam 285 for engaging an insulating bushing 286 mounted on the free end of a contact spring 287, the other end of which is secured to an insulating block 288. The insulating block 288 is secured to a rotatable shaft 289 journaled in a bracket 290 and extending through a water-tight packing box 291 outwardly of the torpedo hull 10 and terminating on the exterior of the body in an adjustable key 292. A second contact arm 293 is mounted on the insulating block 288 and is connected by a flexible conductor 294 to the terminal lug 271. The contact spring 287 is similarly connected by a flexible conductor 295 to a second terminal lug 296 mounted in the insulated bushing 272 and having connected thereto one end of an electric conductor 297, the other end of which is connected to the conductor 243 and thus to the conducting segment 184. The arrangement is such that the key 292 may be adjusted into desired position before the torpedo is fired, and this adjustment determines the position of the insulating block 288 and thus the extent of movement of the cam wheel 284 before the cam 285 strikes the bushing 286. The worm 275 is mounted on a distance gear drive shaft 20 to which there is keyed a pinion 18, which is in constant mesh with the driving gear 17. Thus it will be seen that the solenoid 241 may be actuated after the torpedo has been driven a predetermined distance.

For initially maintaining the separable bodies or paravanes within the torpedo hull 10, the intermediate portion of the torpedo hull is provided on each side with a compartment 301. As the compartments are similar in construction, it is thought that a description of one will suffice for both. Referring to Figs. 4 to 7, it will be seen that there is secured to the inner face of the torpedo hull 10 an inwardly extending plate 302 rigidly secured as at 303, 304 to the hull. As the compartment 301 is at times to be opened to the sea, the connections 303, 304 are made fluid-tight. The plate 302 has a substantially straight portion 305, which is set in from the hull 10 to form a guideway (see Fig. 4) and is recessed to a relatively greater depth as at 306. The compartment 301 thus formed is covered by a sliding door 307, which is dovetailed into the beveled edge of the opening in the hull 21, as at 308. It will be seen that the door 307 is slidable longitudinally of the torpedo, being guided by the beveled edges 308 of the hull.

For actuating the paravane compartment door 307 there is provided thereon a rack 310 having constant mesh therewith a gear 311. The gear 311 is rigidly secured to a shaft 312 journaled in fluid-tight bearings in the plate 302 and extending into the interior of the hull 10. The shaft 312 terminates at its inner end in a gear 313, which meshes with a reciprocating rack 314. The rack 314 is slidably mounted in fixed bearings of conventional form (not shown) and includes a laterally extending lug 315 for engaging near the end of the travel of the rack 314 a paravane release arm 316. A spring 317 secured at one end to a bracket 318 forming part of the hull 10, and secured at its other end to the rack 314, serves normally to maintain the rack in its right-hand position as seen in Figs. 4 and 5. The other end of the rack 314 extends through a cylinder head 319 forming part of a cylinder 320, and terminates therein in a piston 321. The other end of the cylinder 320 is provided with an open port 322. The interior of the cylinder 320 is in communication by way of a pipe 323 with a two-way valve 324 (see Fig. 8). The valve 324 includes a valve stem 325 forming part of a rotatable shaft 326 extending through a fluid-tight bearing 327 into the compartment 301, and terminating therein in a bearing 328. The valve 324 is provided with a normally closed exhaust port 331, and in the normal position of the valve stem 325 the pipe 323 is in communication with a pipe 332, extending from an electromagnetic valve 333. The valve 333 includes a slidable valve stem 334 mounted in a casing 335 and having a supply pipe 336 through which fluid under pressure is supplied thereto. The valve stem 334 is arranged to be moved by spring 337, but is normally latched against such movement by a latch element 338 forming part of the core of the solenoid 241. It will be seen that upon the energization of the magnet 241 in any of the ways hereinbefore described, as by movement of the brush 212 into contact with the segment 213, or by movement of the arm 246 into contact with the pin 244 or by the engagement of the bushing 286 by the cam 285, the latch 338 is actuated to permit movement in a downward direction as seen in Fig. 5, of the valve stem 334 under control of the spring 337.

Each paravane or separable body includes a water-tight hull 340 (see Fig. 16) and is provided with a pair of bodies 341, 342 positioned above and below the hull respectively, on the ends of a pair of vertical fins or vanes 343, 344, the paravane being effectively prevented thereby from undesired rotation about its longitudinal axis when being towed through the water. A bracket 345 is mounted on one side of the hull, secured on the fins 343, 344 as shown in Fig. 6, and forms a support for a pivoted towing element or clutch 346. A towing cable 347 having a metal conducting strand 348 of considerable tensile strength covered by a layer of insulating material such as rubber, is terminated on the element 346, the insulated conductor 348 extending through an insulating bushing 349 in the wall of the hull 340. The conductor 348 terminates in an electrode 350 mounted within a fluid tight glass container 351. The container 351 is mounted in a water compartment 352 forming part of an interior casing 353. The compartment 352 is in communication with the sea by passages 354.

For fracturing the glass container 351 so as to ground the electrode 350 and thus close the circuit to which the conductor 348 is connected, there is provided a pin 360 arranged to detonate a charge 361. The pin 360 is controlled by a momentum device including a movable element 362 and a weighted mass 363 positioned within a chamber 364 within the casing 353. Thus when the paravane strikes an object, and thus has its speed arrested, the momentum of the weight 363 forces the element 362 against the pin 360, thus exploding the charge 361 and breaking the container 351 and permitting the water to contact with the electrode 350.

For steering the paravane in azimuth so as to cause it to take a course spaced apart from but parallel with that of the torpedo, there is provided a pair of vertical runners or fins 370, 370, each having a fixed adjustment with respect to the longitudinal axis of the paravane. Thus when the paravane is being towed by the cable 347 it is automatically maintained on a course having a predetermined relation to that of the torpedo. The paravane also includes a horizontal vane or fin 371 having a horizontal rudder 372 pivotally mounted thereon. The rudder 372 is mounted on a shaft 373 controlled by a hydrostatic device 374. A port 375 provides free communication of the hydrostatic device 374 with the medium in which the paravane is submerged. The hydrostatic device 374 includes pressure responsive means for controlling the adjustment of the rudder 372 and when the paravane is being towed, it is maintained at a predetermined depth thereby. Thus it will be seen that the paravane is automatically maintained in a predetermined horizontal plane.

The bow of the paravane is provided with a depending bracket 380 apertured as at 381 for the reception of one end of the paravane release arm 316. The stern of the paravane is provided with a pin 382 arranged to enter the aperture 329 of the shaft portion 326. In its initial position within the torpedo 10 each paravane is thus mounted on its respective arm 316 and the shaft 326.

Each cable 347 enters the torpedo hull through a packing gland 390 preferably arranged at an acute angle with respect to the wall of torpedo hull. The packing gland 390 is arranged to be lubricated by a grease cup 391 having a spring-pressed plunger 392 and a channel 393 communicating with the gland and through which grease is emitted when the cable is fed out. The cable 347 also passes in proximity to a cable severing device including a piston rod 394 having a knife edge 395 and terminating in a piston 396 snugly fitted within a cylinder 397. A conducting passage 398 in communication with the cylinder 397 is adapted to provide a fluid actuating agent for operating the piston.

The cables 347 are normally stored on spools or reels 400 mounted on a conducting shaft 401. The shaft 401 is journaled in insulating bushings in spaced brackets such as 402, 403 secured to the inner surface of the plate 302. The shaft 401 carries a worm 405 engaging worm wheel 406. The worm wheel 406 is mounted for rotation on a shaft 406A but is insulated therefrom by a bushing 406B. The shaft 406A is supported in brackets 406C mounted on the bracket 403. The lower end of the shaft 401 is provided with a brake drum 407 with which there engages a brake band 408, the friction of which, with respect to the drum, may be adjusted by varying the tension of a spring 409 by means of a nut 410. The tension of the spring 409 is adjusted so as to provide a sufficient drag on the spool 400 to prevent snarling of the cable 347 when it is drawn out rapidly. Also to prevent the paravane from moving away from the torpedo so far as to break the cable 347 when it comes to the end. The end of the conductor 348 of the cable 347 is connected to a lug 411 secured to the hub portion 404 of the shaft 401, and thus electrical connection is provided through the shaft 401 and worm 405 to the worm wheel 406. The worm wheel 406 is provided with an upstanding pin 412 arranged after a predetermined degree of movement of the wheel 406 to contact with a contact spring 413. The contact spring 413 is mounted on an insulating block 414 carried by a bracket 415, and is connected to one pole of a battery 416, the other pole of which is connected to one pole of a battery 416, the other pole of which is connected by a conductor 417 to one terminal of a solenoid 418. The other terminal of the solenoid is connected by a conductor 419 to a contact finger 420 (see Fig. 17), which is mounted on a block of insulation 421. This block also carries a second contact finger 422, which normally engages the finger 420. The contact finger 422 is grounded by a conductor 423 to the hull of the torpedo. The contact finger 422 is provided with a knob of insulating material 424, which is normally in engagement with the end of the valve stem of the valve 425.

The opposite solenoid 418 is controlled by a similar arrangement of apparatus and will hereinafter be set forth.

The solenoid 418 is mounted on a bracket 426 secured to the inner face of the hull 10 and includes a spring pressed armature core 427 forming a latch for a slide valve stem 428. The stem 428 is arranged for reciprocating movement in a valve chest 429 under control of a spring 430. A source of fluid medium under pressure 431 is in communication with an inlet port 432 of the valve 429. The valve 429 also includes a port 433 connected by a pipe 434 to a one way check valve 435 and thus to a pipe 436. The check valve 435 includes a valve stem 437 which permits free movement of fluid medium from the pipe 434 to the pipe 436, but prevents the flow of medium in a reverse direction.

The detailed description hereinbefore given of the paravane refers to the paravane initially positioned on the port side of the torpedo. It will readily be understood that the starboard paravane is similar in construction, excepting that it is arranged for use on the starboard side. Accordingly, a similar paravane release mechanism is also provided on the starboard side including a valve corresponding to the valve 425 of the port side (see Fig. 17), and a check valve corresponding to the check valve 435 and a cylinder corresponding to the cylinder 397. The outlet pipes 434 of the starboard and port control valve 425 have branch pipes 443 and 444 extending to ports 445 and 446 of a rotary valve 450. The valve 450 comprises a casing 451 secured to the inner face of the torpedo hull 10. The casing is provided with a recess as at 452 (see Fig. 22) accessible from the exterior of the torpedo. A valve stem 453 is snugly fitted within the bore of the casing 451, a packing 454 being provided to form a water-tight seal. The exterior end of the valve stem 453 is provided with a square socket 455 for the reception of an adjusting tool. The valve stem 453 is held tightly in its seat by a pin 456 which is mounted in a cap 457 screw-threaded upon the inner end of the casing 451. Thus the valve stem 453 may be rotated by the use of an adjusting tool previous to the discharge of the torpedo, and is held in fixed position thereafter. The valve stem 453 is provided with three ports, 458, 459 and 460 (see Fig. 17). The port 458 registers in all positions of the valve stem 453 with a port 461 which forms one end of a pipe 462 and the port 459 registers in all positions of the valve stem 453 with a port 463 which forms one end of a pipe 464. The port 460 registers in all positions of the valve stem 453 with a port 465 which forms one end of a pipe 466. This pipe communicates with the interior of a cylinder 467 through a port 468, the size of which is controlled by an adjustable needle valve 469. Slidably mounted in the cylinder 467 is a piston 470 which is provided with a keyway 471. Mounted in the side of the cylinder 467 is a key 472 which snugly fits the keyway 471. The piston 470 is provided with a threaded opening 473 in which is fitted a threaded rod 474. This rod is mounted for rotation in the head of the cylinder 475 which is formed into a cup shape and is secured to the shell 10 of the torpedo. A stuffing box 476 surrounds the rod 474 and prevents the entrance of water into the cylinder 467. The end of the rod 474 is provided with a square head 477 which is adapted to be turned by a socket wrench from the outside of the torpedo before it is fired. In the base of the cylinder 467 is located a check valve 478 which operates in a chamber 479. The stem of the check valve 478 is slidably mounted in an adjustable bushing 480 between which and the check valve is mounted a spring 481. The tension of this spring may be adjusted by turning the bushing 480 which is screwed into the base of the cylinder 467. The chamber 479 communicates with a pipe 482 which extends to a cylinder 483. Communicating with the pipe 482 are two branch pipes 484 and 485 which are connected to two check valves 486 and 487. The check valve 486 is connected by a pipe 488 to the pipe 443. The check valve 487 is connected by a pipe 489 to the pipe 444.

Mounted upon the bracket 110, a shaft 500 is provided which projects through a portion of the bracket 110 and has securely mounted thereon a bevel gear 501. The shaft 500 is mounted for rotation in bearings in the bracket 110 and has secured thereto a dog 502 which rotates with the shaft 500. A spring 503 (see Fig. 23) is mounted on the shaft 500 and has its inner end secured to the shaft. Adjacent thereto is a ratchet wheel 504, which is loosely mounted on the shaft 500, the outer end of the clock spring 503 being secured thereto. A spring-pressed pawl 505 is pivotally mounted on the bracket 110, and engages the ratchet wheel 504 so as to permit movement thereof in only one direction. A winding key 506 is secured to the ratchet wheel 504 and is loosely mounted on the end of the shaft 500 so as to wind up the clock spring 503.

The shaft 107 protrudes through the bracket 110 and has slidably but not rotatably mounted thereon a grooved clutch element 507. A pair of bevel gears 508 are loosely mounted on the shaft 107 in position to mesh with the bevel gear 501. The portion of the shaft between the gears 508 is splined and there is slidably mounted thereon the clutch mechanism 507 so as to rotate therewith. The ends of the clutch members 507 are toothed to form ratchet members 509 and 510. The contiguous faces of the bevel gears 508 are provided with complementary ratchet members 511 and 512 in spaced relation with the toothed elements 509 and 510, respectively. The grooved clutch element 507 is engaged by a pin 514 secured near one end of a T shaped lever 515 pivoted at 516 to the bracket 110. The arrangement is such that rotation of the lever 515 about its pivot 516 oscillates the clutch element 507 to engage with one or the other of the bevel gears 508. The bracket 110 includes a lateral extension 518, the outer end of which is provided with a bearing 519 for supporting a shaft 120, which protrudes into a compartment 121 of the torpedo. The portion of the shaft 120 between the bearing 519 and the main part of the bracket 110 is splined as indicated at 520, and there is slidably mounted thereon a clutch element 521 for engaging a clutch element 522, which is secured to the end of the shaft 107. By sliding the clutch element 521 longitudinally with respect to the shaft 120, the shaft 120 may be connected or disconnected from the shaft 107.

For controlling longitudinal movement of the clutch element 521 there is provided an arm 523 pivotally secured as at 524 to the bracket 110, and having a pin 525 engaging a groove in the clutch element 521. The free end of the arm 523 is bent as at 526 and terminates as at 527 in such manner as to engage the dog 502. The arm 523 is normally held in such position that the clutch elements 522 and 521 are in operative engagement by means of a spring 528, one end of which is secured to the arm and the other end of which is secured to the fixed bracket 110. Below the pin 525 the arm 523 is provided with a cam face formed to include a pair of spaced projections 529, 530 with a depression 531 therebetween. A roller 532 is mounted on one end of the T lever 515, which engages the cam surface of the arm 523 and which in the normal position of the T lever registers with the depression 531.

The third arm of the lever 515 is provided with a pin and slot connection indicated as at 533 to a piston rod 534 as will subsequently be set forth. Secured to the end of the rod 534 is a pin and slot connection 533 provided in the lower arm of the lever 515.

The pipes 461 and 464 are connected to opposite ends of a cylinder 464A which is mounted on the bracket 110. Slidably mounted in the cylinder is a piston 534A to which is attached the piston rod 534.

For controlling the rotation of the shaft 107 there is provided intermediate the thrust bearings 111 and 112 of the shaft 107 a worm 535 for driving a worm wheel 536 in mesh therewith. Referring more particularly to Figs. 18 and 24, the worm wheel 536 is loosely mounted on a shaft 537 which is mounted for rotation in bearings in the bracket 110. A pair of collars 538 are secured to the shaft 537, and serve to prevent longitudinal movement thereof with respect to the bracket 110. A portion of the shaft 537 is splined and there is slidably mounted thereon for rotation therewith a member 540, having a grooved hub 541 and a projecting dog 542. The proximate face of the worm wheel 536 is provided with a tongue element 543 for engaging the dog 542. One end of the shaft 537 is also splined and is provided with a cone clutch element 544 slidably mounted on the shaft 537 and rotatable therewith. The cone clutch element 544 engages a stationary clutch element 545 forming in combination therewith a water-tight bearing. The stationary clutch element 545 is recessed as at 546 and is secured in fixed position on the hull 10. The outboard end of the movable clutch element 544 is provided with a pointer or indicator 547 and terminates in a squared end as at 548 for engagement by a socket wrench or other adjusting tool. A compression spring 549 is positioned on the shaft 537 between one of the collars 538 and the clutch member 544 and serves to maintain the movable clutch member 544 in intimate contact with the stationary clutch member 545. The arrangement is such that the pointer 547 indicates on the outside of the torpedo the position of the dog 542.

For controlling the movement of the member 540 on the shaft 537 there is provided a lever 550 pivoted as at 551 to the bracket 110 and provided at one end with a pin 552 which engages the groove of the member 541. The lever 550 is provided at its other end with a pin and slot connection such as 552 to a piston rod 553. The piston rod 553 is connected to a piston 554 snugly fitted in the cylinder 483. A collar 555 is fastened to the piston rod 553 as by being pinned thereto and serves as an abutment for a compression spring 556 which tends to maintain the piston 554 in the position shown, and thus the member 540 in such position that the dog 542 is in the path of movement of the tongue 543. The interior of the cylinder 483 is in communication with the control pipe 482.

Referring to Fig. 29, there is shown a series of enemy vessels 560, 561, 562 etc. The length of each ship is indicated by the dimension A. The length of the space between each two ships of the line in ordinary battle line formation is indicated by the dimension C. Assuming the dimensions cited by Admiral Jellicoe in the quotation hereinbefore given, the dimension A equals 600 feet, and thus with eight ships in line the total length of the ships equals 4800 feet; and the dimension C equals 900 feet or a total of 6300 feet; and thus the ratio of hits to misses, with conventional Whitehead torpedoes of the prior art equals 4800 to 6300 or about 7 to 9. With the present invention, however, the effective danger zone of a torpedo with its two paravanes, each spaced apart therefrom so that its course is 100 feet from the course of the torpedo, as indicated in Fig. 28, is indicated by the dimension B and equals 800 feet. With eight ships in line 8 B equals 6400 feet. In this case the dimension D equalling 700 feet indicates the non-danger space, the total length of the seven spaces being 4900 feet. The ratio of hits to misses accordingly equals 6400 to 4900 or about 9 to 7. In other words, by the use of the present invention the percentage of hits is increased from 43.7 per cent to 56.3 per cent, other conditions being equal.

In operation, the paravanes 340 are initially positioned by being suspended at the bow with the arm 316 registering with the aperture 381 of the bracket 380, in each case, and the stern pin 382 inserted in the aperture 329 of the shaft 326. The door 307 is initially closed. When it is desired to discharge the torpedo, the key 292 is adjusted into desired position according to the distance which the torpedo is to traverse before the paravanes are to be released. If preferred, the time mechanism 245 may be adjusted instead, and the trigger 261 actuated just before the torpedo is discharged, in which case the torpedo will run for a predetermined length of time before the paravanes are released. Under some conditions it may be desired to utilize both the distance gear and the timing mechanism, in which case they are both adjusted, and the key 292 and the trigger 261 are both actuated before the torpedo is discharged. The arrangement is such that the torpedo will be permitted to run at high speed for a predetermined distance or for a predetermined length of time before the paravanes are released, and thus the forward movement of the torpedo will not be retarded by the paravanes until the torpedo reaches the vicinity of the object being attacked. In still other cases, it may be preferable not to employ either the time or distance gear release, but to utilize the radiant energy release device exclusively, as will subsequently appear.

Before the torpedo is discharged, the spring 503 is wound by means of the key 506, precaution being taken that the clutch element 507 is centrally positioned as illustrated in the drawings, and the arm 523 is rotated to its fullest extent in a counter-clockwise direction so as to engage the dog 502 and prevent the gear 501 from turning.

Before the torpedo is discharged, the officers in the plotting room determine the angle through which the torpedo will be required to turn after one of the paravanes encounters an enemy battleship, as shown by the angle θ in Fig. 28. Accordingly, a socket wrench is fitted to the squared end 548 of the movable clutch element 544, which is thereupon turned through the complement of the angle θ. In turning the clutch element 544, it is necessary to press the socket wrench inwardly against the tension of the spring 549, thereby releasing the movable clutch member 544 from the stationary member 545. The pointer 547 accurately indicates the extent of movement. When the pointer 547 indicates the angle 180° minus θ, the wrench is removed, thereby restoring the clutch element 544 under control of the spring 549 into intimate contact with the stationary clutch element 545 and locking it in the adjusted position and simultaneously making the joint water-tight so that no water can enter the torpedo after it has been fired. It will be seen that this adjustment also positions the dog 542 in the same angular position as the pointer 547 and that, therefore, the angle comprehended by the dog and the tongue 543 will be the required angle θ. The order transmitted from the plotting room to the torpedo room includes in addition to information as to the extent of the angle θ instructions as to whether the turning movement should be made in a clockwise or a counter-clockwise direction. If the line of enemy battleships is moving to the right, the adjustment should be made in a clockwise direction while if the enemy is moving to the left the adjustment should be made in a counter-clockwise direction.

Just before being discharged, the usual firing pin (not shown) is released so as to permit explosion of the charge when the torpedo strikes the target. The various electrical circuits shown diagrammatically in the drawings are also closed by means of a conventional switch connected in series therewith but omitted from the drawings for the sake of simplicity, and the source of supply of fluid medium 16 is turned on. The torpedo is thereupon discharged from its tube and the driving means 15 actuated to rotate the shafts 12, 14 and the propellers 11, 11. At the same time, the pinion 18 is actuated to drive the shaft 20, and this motion is communicated at a reduced speed to the shaft 277 and in turn at a still greater reduced speed to the shafts 280, 283 in sequence.

When the torpedo starts upon its course, it is automatically maintained thereon by means of the gyroscopic action of the massive element 95 which is held fixed in space independently of movements of the torpedo. Thus any change in position of the torpedo with respect to its vertical axis causes a relative movement of the housing 65 and the mechanism associated therewith as hereinbefore set forth. This movement is communicated through to the arm 51 which moves the valve rod 50 either to the right or to the left. Assuming that the valve rod 50 is moved to the right of Fig. 2, the source of fluid medium 16 connected to the pipe 41 delivers fluid medium to the right-hand port 38 of the cylinder 36 and thus to the right-hand portion of the cylinder chamber. At the same time, a left-hand port 37 is open. The piston 35 is accordingly moved towards the left. This motion is communicated by the rod 33 to the vertical rudders 30 and and the torpedo is steered towards port until the initial position of the housing 65 with respect to the gyroscope stabilizing element 95 is reached. The valve rod 50 is then returned to normal and the piston 35 restored to its initial central position, with the torpedo moving in its original direction of movement.

If it is desired to change the course of the torpedo, from a distant point, an impulse of radiant energy is sent from a distant station. The radiant energy excites the antenna 218, which trails behind the torpedo. The signals are thus transmitted to a receiving circuit as illustrated in which they are detected and amplified. The amplified signal energy actuates the relay 219, which in turn closes the circuit including the battery 220, armature and front contact of the relay 219 and winding of the secondary relay 221, thus causing the actuation of the relay 221. A circuit is then closed from one pole of the battery 222 armature and front contact of the secondary relay 221, and the windings of the solenoids 181 and 210 in multiple to the opposite pole of the battery 222, thus energizing the solenoids 181 and 210. The impulse employed for steering the torpedo is relatively short, and does not permit the full actuation of the dash pot pistons. The brush 212 is, therefore, maintained in electrical contact with the segment 208. The impulse is sufficiently long, however, to permit the movement towards the right of the armature core 180 of the solenoid 181, and thus the pawl 177 engages the next tooth of the ratchet 176. Upon the cessation of the impulse the relays 219 and 221 and the solenoids 181, 210 are deenergized and the armature core 180 is accordingly returned to normal under control of the spring 183, the armature core 211 being returned under control of its spring. The return movement of the core 180 causes the ratchet 176 to be moved in a counter-clockwise direction one step, and this rotates the shaft 174 and the commutator 170 one step. Return movement of the dash pot piston 197 is retarded by the closing of the trap valve 199 and thus the brush 205 remains in engagement with the conducting segment 208 for a measured interval, the length of which may be controlled by adjustment of the thumb screw 201 of the needle valve 200. A circuit is closed from one pole of the battery 171, conductor 231, brush 212, conducting segment 208, brush 205, conductor 233, contact springs 185, 186, conductor 217, brush 192, conducting segment 187 of the commutator 170, the upper segment 190 now being connected to the brush 191 as a result of the movement of the shaft 174 one step, conductor 233, winding of the solenoid 156, common return conductor 232 to the opposite pole of the battery 171. This circuit remains closed only until the dash pot piston 197 returns to normal, when the brush 205 disengages the conducting segment 208. The energization of the solenoid 156 actuates the valve stem 154 to connect the fluid source 16, by way of the branch pipe 160 to the upper portion of the cylinder 151, it being noted that the lower portion of the cylinder is at this time open to the atmosphere by way of a port 153. The piston 150 is forced downwardly, thus moving the rack 140 and rotating the gear 125. The adjustment of the needle valve 200 is such that the solenoid 157 remains energized sufficiently long to cause the operation of the rack 140 to its full extent, thus rotating the gear 125 through one half a revolution. It will be noted that the duration of the electrical impulse transmitted to the solenoid 157 is independent of the duration of the transmitted signal impulse, and thus complete operation of the rack 140 is assured independently of the operation of the sending station. In the present example, the gear 125 is moved initially in a clockwise direction as seen in Fig. 3, and this motion is communicated by means of the pawl 126 engaging the ratchet 122 to the shafts 120 and 107 thus turning the shaft 107 in a clockwise direction through an angular distance of 180°. Upon the deenergization of the solenoid 156, the rack 140 returns to normal under control of the spring 142, but the pawl 128 is at this time held out of engagement of the ratchet 124 (see Fig. 2) because the lug 131 in this direction of movement strikes the trip 133 to prevent operation of the ratchet 124.

As a result of the single operation of the solenoid 156, the shaft 107 is turned through an angular distance of 180° in one direction. This movement is communicated through the bevel gears 106, 105 and thus to the shaft 102 for actuating the worm 101 and thus moving the cover 64 through a predetermined number of degrees in a clockwise direction, as seen in Figs. 12 to 14. The cover 64 in its movement carries the member 76 with it so that it is shifted relatively to the plate 97 in a clockwise direction. The operation is then the same as previously described for the automatic control, namely, the valve rod 50 is shifted to admit fluid under pressure to the right-hand end of the cylinder 36, thus causing the piston 35 to move and shift the rudder 30 in a clockwise direction so that the torpedo is directed toward the left until it has moved through the same number of degrees that the cover 64 has been moved. When it has reached this position, the member 76 has come into a neutral position with respect to the plate 97 and the torpedo will then proceed upon the new course as required.

If it had been desired to direct the torpedo to the right instead of to the left, the general sequence in operation is the same excepting that two short impulses are transmitted from the sending station. In this instance, the controller 170 is stepped around two steps, thus connecting in the circuit the conducting segment 188 instead of the conducting segment 190. In this case the solenoid 157 is operated instead of the solenoid 156 and the rack 140 is moved upwardly as seen in Figs. 2 and 3. This rotates the gear wheel 125 through one half a revolution in an opposite direction, that is, in a counter-clockwise direction as seen in Fig. 3 and this motion is communicated by means of the pawl 128 engaging the ratchet 124 to the shaft 120, thus turning the shaft in a counter-clockwise direction through an angular distance of 180°. It will be seen that although two impulses are transmitted to the solenoid 181 and that the armature core 180 is reciprocated twice thereby, the dash pot piston 197 is merely moved to the right at the commencement of the first impulse and is delayed in its retraction after the cessation of the first impulse by the closure of the trap valve 199 and the restricted passage for air through the needle valve port 200. After the termination of the first impulse the dash pot piston 197 and the brush 205 start to move gradually to the left under the action of the spring 202 and retarded by the restriction of the valve 200. As long as the brush 205 remains on the insulation 209 the circuits from the batteries 171 will remain open. Before the brush 205 has reached the segment 208 the second impulse is sent which as already described returns with brush 205 and piston 197 to the extreme right-hand position. At the termination of this impulse the brush 205 starts to move gradually to the left again until it engages segment 208, at which time the local circuit is closed from the battery 171, conductor 231, brush 212, conducting segment 208, brush 205, contact springs 185, 186, conductor 217, brush 192, conducting segments 187, 188 of the controller 170, brush 189, conductor 234, winding of the solenoid 157, common return conductor 232, to the opposite pole of the battery 171. It will thus be seen that only a single impulse is transmitted to the solenoid 157. Upon the deenergization of the solenoid 157, the rack 140 returns to normal from the control of the spring 142, but the pawl 126 is at this time held out of engagement of the ratchet 122, because the lug 130 in this direction of movement strikes the trip 132 to prevent the operation of the ratchet 120.

As a result of the single operation of the solenoid 157, the shaft 107 is turned through an angular distance of 180°, and this movement being communicated through the gear train moves the cover 64 in a counter-clockwise direction, as seen in Figs. 12 to 15, thus actuating the rudder 30 in a counter-clockwise direction so that the torpedo is directed towards the right. It will be apparent that by suitably selecting the gears through which this motion is transmitted the course of the torpedo can be shifted to port or to starboard any predetermined number of degrees as a result of the transmission of a radiant energy signal. It has been found desirable, however, to provide gear mechanisms such that the course of the torpedo is shifted through an angular distance of five degrees in response to each impulse.

The course of the torpedo may subsequently be changed as many times as may be desired by the transmission of one short impulse or two short impulses in order to position the controller 170 into the required position. For instance, after the course of the torpedo has been shifted to the right, as above described, if it should be desired to shift it further to the right through an additional angular distance of five degrees, it is only necessary to transmit two additional short impulses. If, however, the next deviation of the course is desired to be made to the left a single additional impulse is transmitted.

Thus the course of the torpedo can be accurately controlled until it has been directed into proximity with the fleet of battleships being attacked. A long impulse is now transmitted from the radiant energy sending station. The relays 219, 221 are energized thereby, thus closing the circuits of the solenoids 181, 210. The armature core 180 is moved to the right as seen in Fig. 9, thus disengaging the spring 185 from the spring 186. The dash pot rod 203 is moved towards the right at a high speed and the companion dash pot rod working with solenoid 210 is moved to the right at a relatively slower speed, being retarded in its movement by the flow of air through the regulated needle valve. The impulse is sufficiently long to permit both the dash pot rods to be moved to the full extent of their travel and thus the brush 205 engages the insulating segment 209, while the brush 212 is moved sufficiently to engage the conducting segment 213. A circuit is now closed from one pole of the battery 171, conductor 231, brush 212, conducting segment 213, conductor 240, winding of the solenoid 241, conductor 242, to the opposite pole of the battery 121, thus energizing the solenoid 241. The armature core 338 is actuated, thus unlatching the valve stem 334, which moves under control of the spring 337. The fluid source 16 is now connected by way of the branch pipe 336, valve 333, port 332 of the rotary valve 324, which is initially in the position shown in Fig. 8, conducting pipe 323 to the cylinder 320, thus forcing the piston 321 towards the left of Fig. 5. It is understood that the solenoid 241 of the port side as well as the corresponding solenoid of the starboard side are both energized and that the operation to be described for the port paravane occurs simultaneously in connection with the starboard paravane. Movement of the piston 321, and its rack 314 rotates the gear 313, and this movement rotates the gear 311 in a clockwise direction, as seen in Fig. 4. The gear 311, which engages the rack 310 accordingly moves the rack 310 and the paravane compartment door 307 attached thereto towards the right of Fig. 4. In this movement, the door 307 is guided by its beveled edges 308 (see Fig. 7). Near the end of its travel the lug 315 engages the lower end of the release arm 316 and rotates the arm about its vertical longitudinal axis, thus removing the upper end of the arm from the aperture 381 in the bracket 380 of the paravane. As the torpedo is moving forward, that is, toward the right of Fig. 4, the front end of the paravane is swung outwardly therefrom, and the paravane rotates around the shaft 326, to which it is pinned by its stern pin 382. This rotary movement of the paravane is communicated to the shaft 326 and rotates the valve stem 325 correspondingly. When the paravane has moved through an angular distance of approximately 90° it is free to release itself from the torpedo and accordingly moves outwardly therefrom. At this time the shaft 326 has also been rotated through an angular distance of 90°, thus cutting off the inlet port 332 of the valve 324 and discharging the pipe 323 to atmosphere through the exhaust port 331 (see Fig. 8). The piston 321 is thus returned to its normal position under control of the spring 317, and this movement is communicated by way of the shaft 312 to the door 307, which is also restored to its normal or closed position. Each paravane is now towed by the cable 347, the cable being paid out through the gland 390. As the cable may be pulled at a relatively high rate of speed grease is supplied through the channel 393 from the grease cup 391, so as to prevent injury to the towing cable and to provide a water tight packing for the cable outlet.

While the cable 347 is being pulled out it is drawn off the reel 400, rotation of which is retarded to a limited extent by the friction band 408 which engages the brake drum 407, thereby effectively preventing the cable from becoming snarled when being paid out at high speed. When the towing cable 347 has been paid out to a desired extent, whereby the paravane may take up a sufficiently spaced parallel course from the course of the torpedo, the worm wheel 406 has rotated to a sufficient extent to cause the pin 412 thereon to contact with the spring 413, thus preparing the circuit of the torpedo control solenoid 418 of the respective paravane.

Upon cessation of the long impulse of radiant energy the relays 219, 221 are deenergized, thus causing the deenergization of the solenoids 181, 210. The controller 170 is thus moved a single step, but the circuits of the solenoids 156, 157 are held open because the brush 205 engages the insulating segment 209. The dash pot pistons are now restored towards the left of Fig. 9 at a relatively slow rate, but as the rocking lever is in the path of movement of the collar carrying the brush 212 the dash secured to the pot rod is stopped in such position that the brush 212 engages the insulating segment 209. The dash pot rod 195 restores fully to normal, however, and after the brush 205 has left the conducting segment 208 and is in engagement with the normal insulating segment 207 the latch 204 trips the element 216 and oscillates the rocking arm in a counter-clockwise direction, thus releasing the collar. The second dash pot rod now is restored fully to normal under control of its spring. It will be noted that in sending a long impulse no impulse is transmitted to the solenoids 156, 157.

If it is desired to utilize the distance gear mechanism for releasing the paravanes, and the distance gear key 292 is adjusted to measure off the predetermined distance and thus the cam wheel 284 causes the cam 285 to strike the bushing 286 upon movement of the torpedo through the measured distance of travel. The contacts 287, 293 are thereupon closed, thus closing the circuit from the battery 171, conductor 270, terminal lug 271, flexible conductor 294, contact springs 293, 287, flexible conductor 295, terminal lug 296, conductors 297, 243, 240, windings of the solenoids 241, in multiple (see Fig. 5), conductor 242 to the battery 171. The energization of the solenoids 241 causes the release of the paravanes in the same manner as has been described in connection with the sending of a long impulse of radiant energy.

If it is desired, because of weather conditions or otherwise, to utilize the time control mechanism for releasing the paravanes, and the trigger 261 is actuated as the torpedo is discharged, the clock mechanism 245 causes the rotation of the arm 246 at a measured rate. After the predetermined time interval has expired, the contact arm engages the pin 244, thus closing the following circuit: Battery 171, conductors 248, 247, arm 246, conductors 243, 240, windings of the solenoids 241 in parallel (see Fig. 5) conductor 242 to the battery 171. The energization of the solenoids 241 causes the release of the paravanes in the same manner as previously described.

After the paravanes have been released they are each towed by the torpedo. Should the torpedo make a direct hit upon the target the explosive is discharged in the usual manner. However, if the course of the torpedo is such that while it will not of itself make a direct hit, the target lies in the path of the port paravane, then the momentum device 362 is actuated upon the sudden stoppage of the paravane when it comes in contact with the target. The pin 360 detonates the charge 361 and fractures the container 351 whereupon the electrode 350 is electrically connected to the sea water. A circuit is now closed from the electrode 350, conductor 348, of the towing cable 347, lug 411, hub 404 of the shaft 401, worm 405, worm wheel 406, pin 412, contact spring 413, battery 416, conductor 417, winding of the solenoid 418, conductor 419, contact fingers 420 and 422, conductor 423 to the hull 10, and thus by a return path through the sea to the electrode 350. The solenoid 418 is energized and moves downwardly under the action of the spring 430 until the head of the stem engages the top of the valve chest 429. In this position the ports will be connected together so that compressed fluid may flow from the supply pipe 431 to the pipe 434.

Assume that the valve stem 453 has been turned in a clockwise direction prior to the discharge of the torpedo as required when the enemy is moving to the left as seen in Fig. 25 and is seen in the position illustrated in Fig. 17. The fluid medium now passes from the pipe 434 through the check valve 435 and the pipe 436 to the interior of the cable-severing cylinders 397 and 442. Compressed fluid also flows into the pipe 443 and thence to the port 445, (see Fig. 17). From here it passes through ports 458 and 461 to the pipe 462 and thence to the right hand side of the cylinder 464A, which causes the piston to be moved to the left. The operation of the piston 534A towards the left of Fig. 2 oscillates the arm 515 in a clockwise direction about its pivot 516. The roller 532 of the arm 515 engages the cam face of the projection 529 and oscillates the arm 523 in a clockwise direction about its pivot 524, thus carrying the pin 525 and the slidable clutch element 521 towards the right. The clutch element 521 is thus moved out of engagement with the clutch element 522 and the operative connection between the shaft 120 and the shaft 107 is thereby broken. This action disconnects the radio control mechanism from the steering mechanism. At the same time the end 527 of the arm 523 is removed from engagement with the dog 502 and the shaft 500 is released for rotation under control of the clock spring 503. The bevel gear 501 which is secured to the shaft 500 is thus rotated. At the same time the pin 514 which is secured to one arm of the T shaped lever 515 moves clutch element 507 towards the right and thus causes the ratchet 509 to engage the ratchet 511, thereby coupling the right hand gear 508 to the shaft 107. The shaft 107 is accordingly driven under control of the clock spring 503, the operative connection including the bevel gears, the ratchets, and the clutch element which is splined on the shaft 107. The shaft 107 is thus rotated, and its movement is communicated through the gear train to move the cover 64. The operation is then the same as previously described for the automatic control and for the radio control, namely, the valve rod 50 is shifted to admit fluid under pressure to the right-hand end of the cylinder 36 thus causing the piston 35 to move and shift the rudder 30 in a clockwise direction so that the torpedo is directed towards the left. It will thus be seen that the torpedo moves in a circular course towards port (see Fig. 28). This operation continues until the tongue 543 of the wheel 536 engages the dog 542, which, as already described, has been turned through the angle $\theta$. When this occurs the rotation of the gear 536 is stopped which also prevents a further rotation of the shaft 107. The top plate 64 of the gyroscopic mechanism is therefore stopped in this position after being turned through the angle $\theta$. The torpedo will, therefore, turn through the angle $\theta$ and then proceed upon a straight course until it strikes the enemy's ship, as indicated in Fig. 28.

In case the starboard paravane 340 encounters the target as in Fig. 27 the action is similar, excepting that the starboard valve 425 is actuated instead of the port valve 425. Fluid under pressure is thus admitted to the pipe 444 instead of to the pipe 443. The fluid under pressure also passes through check valve 441 to operate the cable severing mechanisms 397 and 442, as previously explained. From pipe 444 the fluid under pressure passes to port 446, thence through ports 460 and 465 to the pipe 466, from which it passes by the needle valve 469 and through the port 468 into the cylinder 467.

The piston 470 of this cylinder has already been moved up by means of turning the rod 477 before the torpedo was fired, the distance depending upon the speed and course of the enemy's ship as will hereinafter be explained. The fluid under pressure now gradually passes into the cylinder 467 building up a pressure in this cylinder until it is sufficient to open the valve 478 against the tension of the spring 481. The time that it will take before this valve opens is dependent upon the volume of the cylinder 467 below the piston 470. The fluid under pressure then passes into the chamber 479 and thence to pipe 482, passing from there into branch pipe 484 and through check valve 486 the pipes 488 and 443 and the ports 445, 458 and 461 to the pipe 462. From this pipe the fluid under pressure passes into the right-hand side of the cylinder 464A to cause the torpedo to turn to the left in a manner similar to that already described.

The fluid under pressure will also pass from the pipe 482 to the cylinder 483 thereby moving the piston 554 upwardly as seen in Fig. 24 and rotating the lever 550 in a clockwise direction which will slide the hub 540 longitudinally with respect to the shaft 537. This movement of the hub 540 carries with it the projecting dog 542 which is thereby moved out of the path of the tongue 543. The gear 536, therefore, continues to rotate until the tongue 543 strikes the frame when the motion of the gear 536 is stopped thereby stopping the rotation of the top of the gyro casing 64. This will have turned through an angle slightly less than 180° so that the torpedo will follow the course as shown in Fig. 27. After it has completed approximately a half circle it will then follow the straight course striking the enemy's ship as indicated.

It will be seen, therefore, after the paravane has struck the enemy that the torpedo will follow a U shaped course, the character of which is dependent upon the speed and course of the enemy ship. If the speed of this ship is relatively high with respect to the speed of the torpedo, that is not less than approximately 65% of the speed of the torpedo and the enemy is running at right angles to the course of the torpedo, as shown in Fig. 27, it will probably not be necessary to move the piston 470 from its position at the bottom of the cylinder 467 as the torpedo can make a semicircle as soon as the paravane strikes the enemy. If the enemy's speed is less than this, however, it will be necessary to move the piston 470 to a position in the cylinder 467 which will cause a delay of $t$ seconds before the fluid under pressure passes to the cylinder 464A. During this interval of $t$ seconds the torpedo will travel along the straight course before it starts to make the semi-circle. This time, $t$ is determined by the officers in the plotting room from the speed and course of the ship and the speed of the torpedo. This information is given to the man at the torpedo who, by means of a socket wrench turns the rod 474 a certain number of revolutions which will cause the piston 470 to be properly positioned in the cylinder 467.

If the enemy is moving towards the right, as observed from the ship from which the torpedo is discharged, the valve stem 453 is turned in a counter-clockwise direction to the position shown in Fig. 26. Assume now that the starboard paravane strikes one of the ships. The starboard valve 425 is actuated in the maner hereinbefore-described and admits fluid under pressure to the pipes 434, 444 and the cable receiving cylinders 442 and 397 as before described. As the valve stem has now been turned in a counter-clockwise direction, the fluid under pressure will now pass through pipe 444 and the ports 490, 459 and 463 to the pipe 464, thence to the left-hand side of the cylinder 464A. The piston 534A is moved towards the right of Fig. 2 and the T arm 515 is moved in a counter-clockwise direction about its pivot 516. The roller 531 engages the cam face of the projection 530 and moves the lever 523 as before to disengage the radio control apparatus and to release the dog 502. The bevel gear 501 is thus rotated under control of the clock spring 503. At the same time the pin 514 of the T arm 515 is moved towards the left, thus moving the clutch member to the left and causing the ratchet members 510 and 512 to be engaged, thus coupling the bevel gear 501 to the shaft 107. As the shaft 500 is moved in the same direction as before, under control of the clock spring 503, but the bevel gear 501 is now coupled to a shaft 107 by means of the left-hand gear 508, the shaft 107 is moved in the opposite direction from that previously described and thus the gyro mechanism for controlling the rudder is moved to turn the course of the torpedo to starboard instead of to port. This action continues until the tongue 543 strikes the dog 540, which occurs after the torpedo has turned through the angle θ, after which the course of the torpedo is righted and it assumes a straight course. In this case, however, the torpedo has been turned in the opposite direction to that in which it was turned for the enemy moving to the left.

The torpedo will, therefore, turn to the right through the angle θ and then proceed upon a straight course until it strikes the enemy ship in a manner similar to that described in connection with Fig. 28. Assume now that the port paravane strikes one of the enemy ships. The port valve 425 is actuated and admits fluid under pressure to the pipe 434 and through the check valve 435 to the pipe 436. The cable severing mechanism 397, 442, are actuated and fluid under pressure is admitted through the pipe 443, the ports 445, 460 and 465 to the pipe 466 thence into the cylinder 467 where the action is delayed, after which the fluid under pressure passes to the pipe 482 to move the dog 542 out of the path of the tongue 543. Fluid under pressure also passes through branch pipe 484, check valve 487, pipes 489 and 444, through the ports 446, 459 and 463 to the pipe 464, thence to the left-hand side of the cylinder 464A which as previously described causes the top of the gyro pot 64 to be rotated in a counter-clockwise direction.

In the modified embodiment shown in Fig. 19, the cable reel 600 is mounted on a pair of independently movable brackets such as 601 instead of the fixed brackets 402, 402 of the previously described embodiment. Each of the brackets 601 is pivotally mounted as on a pivot 602 upon a fixed bracket 603 projecting inwardly from the hull 10 of the torpedo. A tension spring 604 secured at one end to an ear 605 forming part of the bracket 601 and at its other end to a fixed lug 606 secured to the hull 10 serves to maintain the brackets 601 in the position illustrated. The tension of the springs 604 is sufficient to overcome the normal pull of the respective cable 347 when towing the paravane. The upper bracket 601 carries the worm gear train 405, 406, the worm wheel 406 having the pin 412 for contacting with the contact spring 413 as in the previously described embodiment. The upper bracket 601 carries a contact spring 607 mounted on a block of insulation 608 and electrically connected as by a conductor 609 to the contact spring 413. An insulating block 610 is secured to the hull 10 and carries a contact point 611 in such position as to be engaged by the free end of the contact spring 607 when the respective bracket 601 is oscillated about its pivot 602 in a clockwise direction as seen in Fig. 19. In this embodiment, the shaft of the reel 600 is not insulated from the supporting brackets, and thus the pin 412 is electrically connected through the worm gear train to the hull of the torpedo. Furthermore, in this embodiment the towing cable 347 need not include any layer of insulation, and the detonating apparatus of the paravanes may also be omitted. The arrangement is such that when the paravane strikes its target the towing cable 347 is pulled sufficiently to overcome the tension of the spring 604 and thus the brackets 601 are oscillated sufficiently to cause the contact spring 607 to engage the contact point 611. A circuit is then closed from the hull 10 over conductor 419, winding of the solenoid 418, conductor 417, battery 416, contact point 611, contact spring 607, conductor 609, contact spring 413, pin 412, through the worm gear connection comprising the worm wheel 406 and the worm 405, shaft 401, bracket 601, pivot 602, bracket 603, to the hull of the torpedo 10 thus energizing the solenoid 418 and initiating the same cycle of operation which has been previously described in connection with the embodiment of Fig. 6 to modify the course of the torpedo.

In the modified embodiments of Figs. 20 and 21 a circuit known as the Hughes balance is employed for detecting the proximity of one of the paravanes to an enemy battleship. This embodiment is employed with an insulated towing cable 347 and an insulated storage spool 400 as in the embodiment first described, but the detonating mechanism of the paravane illustrated in Fig. 16 is omitted. Instead, each paravane is provided as shown in Fig. 20 with a loop 620 of insulated wire, one end of which is grounded to the hull of the paravane as at 522 (see Fig. 21), and the other end of which is connected with the conductor 348 of the respective towing cable 347. There is mounted within the torpedo an alternating current generator 623 having one terminal grounded as at 622 to the hull 10 of the torpedo, the other terminal of the generator 623 is connected by way of a conductor 625 and a branch conductor 626 through a winding 627 of a stationary electromagnet 628, and by way of a flexible conductor 629 to one terminal of a winding 630 of a relatively movable electromagnet 631, the other terminal of which is connected by a flexible conductor 632 and through a winding 633 of a stationary electromagnet 634 to the conductor 348 of one of the paravanes for example the starboard paravane. The main conductor 625 of the A. C. generator 623 is also connected by way of a branch conductor 636 to a winding 637 of a stationary electromagnet 638 and by way of a flexible conductor 639 to one terminal of a winding 640 of a relatively movable electromagnet 641, the other terminal of which is connected by a flexible conductor 642 and through a winding 643, of a stationary electromagnet 644 to the conductor 348 of the other paravane for example the port side paravane. The movable electromagnets 631 and 641 are mounted on opposite ends of a balanced arm 645 pivoted as at 646 and maintained normally in mid position by a pair of balancing springs 647, 648. The arm 645 also carries a contact spring 649 connected as by a flexible conductor 650 to one pole of a source of energy such as a battery 651, the other pole of which is connected by branch conductors 652, 653 to one terminal of the solenoids 418, 418 respectively. The other terminal of the port side solenoid 418 is connected by a conductor 654 to a contact point 655 engaged by the contact spring 649 when the arm 645 is oscillated in a counter-clockwise direction as seen in Fig. 21, and the other terminal of the starboard solenoid 418 is connected by conductor 656 to a contact point 657 engaged by the contact spring 649 when the arm 645 is oscillated in a clockwise direction about its pivot 646.

In the operation of the embodiment of Figs. 20, 21 the arm 645 is normally balanced by the balancing springs 647, 648. After the torpedo has been discharged and the paravane released therefrom in the manner hereinbefore described, the paravanes are towed by the torpedo. The arm 645 is still maintained in its mid position, the magnetic circuits of its actuating electromagnets remaining balanced. Should one of the paravanes come in proximity to a mass of metal such as an armored battleship, the magnetic circuits of the actuating electromagnets of the arm 645 are unbalanced. For example, if the starboard paravane is brought near an enemy battleship the magnetic balance of the circuit is modified and the arm 645 is rotated in a clockwise direction. The contact spring 649 thereupon engages the contact point 657 and a circuit is closed from the battery 651, conductor 650, arm 649, contact 657, conductor 656, winding of the starboard solenoid 418, conductor 653, to the battery 651, thus energizing the solenoid 418 and initiating the same cycle of operation which has previously been described in connection with the embodiment of Fig. 6 so as to modify the course of the torpedo. In a similar way if the port paravane comes into proximity to a ship the magnetic balance of the circuit is modified to move the arm 645 in a counter-clockwise direction. The contact spring 649 thereupon engages the contact point 655 and the circuit is closed from the battery 651, flexible conductor 650, contact spring 649, contact point 655, conductor 654, winding of the port side solenoid 418, conductor 652 to the opposite pole of the battery 651, thus energizing the port solenoid 418 and initiating a similar cycle of operation.

The invention upon which this application is based is broader than the specific embodiments shown and described for the purpose of illustrating at least some of the ways in which it may be employed. The scope of the invention is, therefore, to be understood as not being limited by the present specific description. I intend no limitations other than those imposed by the claims.

What is claimed is:—

1. In a torpedo a pair of auxiliary members, means for directing said torpedo in response to the influences received by one of said auxiliary members, and means for releasing both of said auxiliary members after said torpedo has been directed in response to influences received by one of the members.

2. In a torpedo auxiliary members carried by said torpedo and dischargeable from said torpedo, means for directing said torpedo in response to influences received by said auxiliary members, means for releasing said auxiliary members from said torpedo after they have directed said torpedo in response to influences received thereby, and means for further directing said torpedo after said auxiliary members have been released.

3. A torpedo comprising a body portion, a pair of paravanes carried within and dischargeable from said body portion, means for steering said torpedo through a predetermined angle when one of said paravanes receives predetermined influences, and means for steering said torpedo through a predetermined angle in the opposite direction when the opposite paravane is subjected to predetermined influences.

4. A torpedo, a pair of paravanes associated with said torpedo, means for directing said torpedo comprising a gyroscopic element and grooved plate maintained in a fixed position by said gyroscopic element, a support adjacent said plate, a finger carried by said support and adapted to intermittently engage a groove of said plate only when said plate and said casing remain in their original relative positions, means for actuating a steering mechanism when said finger fails to engage the groove in said plate, and means for moving said support in one direction in response to particular influences received by one of said paravanes and means for moving said support in the opposite direction in response to particular influences received by the other of said paravanes.

5. In a torpedo a pair of paravanes carried by said torpedo, a gyroscope for normally maintaining said torpedo in a predetermined path, and means for altering said gyroscope setting in response to influences received by said paravanes.

6. A torpedo, paravanes carried by said torpedo, a gyroscope for maintaining said torpedo in a predetermined path of travel means for altering the gyroscope setting in response to radiant energy signals, and means for altering the gyroscope setting in response to influences received by said paravanes.

7. A torpedo, a pair of paravanes carried by said torpedo, fluid pressure means for driving said torpedo, and fluid pressure means for steering said torpedo in response to influences received by said paravanes.

8. A torpedo, paravanes carried within said torpedo, fluid pressure means for discharging said paravanes from said torpedo, and fluid pressure means for releasing said paravanes from said torpedo.

9. A paravane for use in connection with torpedoes, comprising a body, an electrode within said body, and means for allowing said electrode to contact with water upon receipt of a predetermined influence by said paravane.

10. A paravane for use in connection with torpedoes, comprising a body, a compartment within said body, an electrode within said compartment, an explosive charge within said body, and means for exploding said charge and fracturing said compartment in response to a predetermined influence received by said paravane.

11. The combination with a movable body, of means to stabilize said body with respect to a given axis, and a separable body towed by said body on a course spaced from the course of said first named body, and means to modify the control of said first named body with respect to said axis by said separable body.

12. The combination with a movable body, of means to stabilize said body with respect to a given axis, a separable body removable therefrom to modify the control of said first named body with respect to said axis, means mounted on the first body to support the second named body thereon initially, and means responsive to radiant energy to release the last named body from the mounting means.

13. The combination with a movable body, of means to stabilize said body with respect to a given axis, a separable body removable therefrom to modify the control of said first named body with respect to said axis, and means responsive to radiant energy to initiate the action of said separable body.

14. A system for the control of moving bodies, including in combination, a body to be propelled, steering means thereon, means acting upon said steering means to maintain a predetermined direction of bodily movement of said body, a second body to be towed by the propelled body and initially carried thereby, means under control of the sender of the body to release the second body, means effective upon the actuation of said release means to tow the second body, and means positioned on the towed body for causing the towed body to maintain a course spaced apart from the course of the propelled body.

15. A torpedo adapted to be aimed at a ship and comprising a body, a pair of paravanes carried on opposite sides of said body and adapted to be released therefrom, an angle control member adapted to be set at a predetermined angle before firing said torpedo, a selector member adapted to be set according to the direction of ship travel before firing said torpedo, a timing device adapted to set before firing said torpedo, a steering device, means, including said steering device, whereby said torpedo will change its course to follow said ship when either of said paravanes is influenced by said ship, the torpedo turning through the said angle if a paravane is influenced by the aft of said ship, the torpedo turning substantially around after a time interval controlled by said timing device if the other paravane is influenced by the bow of said ship.

16. A torpedo adapted to be aimed at a ship and comprising a body, a pair of paravanes carried on opposite sides of said body and adapted to be released therefrom, an angle control member carried by said body and adapted to be set at a predetermined angle, and means whereby said torpedo will change its course through said angle when one of said paravanes is influenced by the rear of said ship to follow it.

17. A torpedo adapted to be aimed at a ship and comprising a body, a pair of paravanes disposed on opposite sides thereof, and adapted to be released therefrom, a steering device, a timing device, means for setting said timing device, means operative by the influence on one of said paravanes by the front of a ship and controlled by said timing device for operating said steering device to cause said torpedo to turn and travel in substantially the opposite direction.

18. A torpedo adapted to be aimed at a ship comprising a body, paravanes enclosed within said body, means for releasing said paravanes, a selector member adapted to be set before firing said torpedo according to the direction of ship travel, and means depending upon the setting of said member for causing said torpedo to turn in a direction to follow said ship, no matter which paravane is influenced by said ship.

19. In combination, a torpedo, a pair of paravanes disposed on opposite sides thereof, a rudder on said torpedo, a first valve operable by one paravane for influencing said rudder, a second valve operable by the other paravane for influencing said rudder in a different manner, first and second electromagnets for controlling said first and second valves, means whereby either paravane may operate its respective electromagnet when it contacts a foreign object, and interlocking means for rendering the other valve inoperative.

20. In combination, a missile, a pair of influencing members carried thereby, a steering device for said missile, means whereby said members upon influence from a foreign body affect said steering device in different manners, and means for rendering one of said members ineffective when the other member affects said steering device.

21. In combination, a torpedo comprising a body, paravanes associated therewith, each paravane being connected to said body by a strand, means for releasing said paravanes from said body, means operative by contact of any one of said paravanes with a foreign object for severing both of said strands at said body.

22. A torpedo comprising a body having a shallow pocket in its surface, a door over said pocket and adapted to slide along the skin of said torpedo to open said pocket, an air cylinder, a piston therein, connection between said piston and said door, a paravane in said pocket having a projection, a pin swiveled in said body and having an opening for said projection, a source of compressed air, first and second air valves connected in series between said source and said cylinder, an electromagnetic trip for operating said first air valve to allow air into said cylinder, said pin being connected to said second air valve to shut off communication with said cylinder when the release of said paravane rotates said pin, and a spring for closing said door after the paravane has left the pocket.

23. A torpedo comprising a body having a pocket in its surface, a door over said pocket, a paravane disposed in said pocket, means for opening said door to discharge said paravane, and means operated by the discharge of said paravane for closing said door.

24. A paravane comprising a hollow torpedo-like body, a reservoir therein having communication with the outside of said body, a sealed frangible container in said reservoir, a cable connected to said body including insulated wire connected to the inside of said container, an inertia hammer located adjacent to said container and adapted to break said container when the paravane hits a member.

25. In combination, a torpedo, a paravane, a member connecting said torpedo and paravane for towing the paravane by the torpedo, and means for changing the course of said torpedo by the influence of a foreign element on said paravane when said torpedo is towing said paravane through water.

26. In combination, a torpedo, a paravane, an electric wire connecting said torpedo and paravane, means for causing an electric connection between said wire and the water at said paravane to influence said torpedo when said paravane strikes a target.

27. A torpedo comprising a body, a pair of paravanes enclosed within said body, said paravanes being connected to said body by strands, means for releasing said paravanes from said body and means for severing said strands at said body after said paravanes have been released.

28. A vehicle comprising a body, a paravane enclosed within said body and connected thereto by a strand, means for releasing said paravane from said body, means for controlling said body by influence of a foreign object on said paravane, and means for severing said strand after said body has been controlled.

29. In a torpedo, a torpedo body, paravanes carried by said body, first means responsive to radiant energy of predetermined characteristics for steering said body and second means responsive to radiant energy of different characteristics for discharging said paravanes from said body.

30. A torpedo comprising a main body, steering devices on said body, an auxiliary body spaced from said main body to extend the sphere of action of the torpedo, and means for operating said steering devices by the influence of the target on said auxiliary body.

31. In a torpedo, a main torpedo body, steering means for steering said torpedo body in azimuth, an auxiliary body separate from but connected to said main body to increase the scope of the torpedo, and means for operating said steering means when said auxiliary body is affected by a foreign body.

32. In a missile, a main body, steering means for said body, a separate auxiliary body connected to said main body to increase the striking range of the missile, and means for operating said steering means when said auxiliary body is influenced by the target.

33. A torpedo comprising a main body, steering devices on said body, an auxiliary body cooperating with said main body to extend the sphere of action of the torpedo, and means for operating said steering devices by the influence of the target on said auxiliary body.

34. In combination with a movable body, steering mechanism therefor, means for automatically operating said steering mechanism to maintain said body on a predetermined course, a trailing wire carried by said body, a redirecting mechanism, and means operable by a mass of material adjacent said wire for rendering said redirecting means operative, and turning said body through a predetermined angle.

35. In combination with a movable body, steering mechanism therefor, means for automatically operating said steering mechanism to maintain said body on a predetermined course, a trailing wire carried by said body, a redirecting mechanism, and means operable by a mass of material adjacent said wire for rendering said redirecting means operative, and turning said body through a given angle, and means for mechanically disconnecting said wire from said body after said redirecting means is operated.

36. In combination with a torpedo, a trailing antenna-like member, means operable when said member is influenced by a ship for redirecting said torpedo, and means for delaying the operation of said redirecting means for a predetermined period of time.

37. In a self-propelled body, stabilizing means for normally maintaining said body upon a pre-selected course, steering means responsive to remote control for selectively altering said course, and means for selectively disengaging said steering means from said stabilizing means whereby the stabilizing means may be adjusted to effect a pre-selected course of the body.

38. In combination with a self-propelled body, steering means responsive to remote control, said steering means comprising a direction control member, a first means operatively associated with said control member for selectively positioning said member, a second means operable in accordance with the position of said control member for modifying the position of the steering elements of the body, and delay means for suspending the actuation of said second means a predetermined time after the positioning of said control member is initiated.

39. In combination with a self-propelled body means for normally maintaining said body upon a pre-selected course and steering means responsive to remote control for selectively altering the course of said body, said steering means comprising a direction control member, means for selectively positioning said member, an impulse control member associated with said direction control member, means initiated in response to the actuation of said impulse control member and operable in accordance with the position of the said direction control member for modifying the position of the steering elements of the body, and delay means for suspending the actuation of said impulse control member a predetermined time after the positioning of said direction control member is initiated.

In testimony whereof I have hereunto set my hand.

JOHN HAYS HAMMOND, JR.